US012621786B2

(12) United States Patent
Nassar et al.

(10) Patent No.:  US 12,621,786 B2
(45) Date of Patent:         May 5, 2026

(54) APPARATUSES, METHODS, AND COMPUTER PROGRAM PRODUCTS FOR FIFTH-GENERATION SYSTEM MULTIPLE REGISTRATION WITH EVOLVED PACKET SYSTEM NETWORK INTER WORKING

(71) Applicant: Nokia Technologies Oy, Espoo (FI)

(72) Inventors: Mohamed Amin Nassar, Munich (DE); Devaki Chandramouli, Dallas, TX (US); Pallab Gupta, Bangalore (IN); Georgios Gkellas, Athens (GR); Laurent Thiebaut, Massy (FR)

(73) Assignee: Nokia Technologies Oy, Espoo (FI)

( * ) Notice: Subject to any disclaimer, the term of this patent is extended or adjusted under 35 U.S.C. 154(b) by 537 days.

(21) Appl. No.: 18/067,488

(22) Filed: Dec. 16, 2022

(65) Prior Publication Data

US 2024/0205863 A1      Jun. 20, 2024

(51) Int. Cl.
*H04W 60/04*          (2009.01)
*H04W 76/16*          (2018.01)

(52) U.S. Cl.
CPC ........... *H04W 60/04* (2013.01); *H04W 76/16* (2018.02)

(58) Field of Classification Search
CPC ............... H04W 60/005; H04W 36/14; H04W 36/0022; H04W 60/04; H04W 76/16; H04W 12/37; H04W 60/00
See application file for complete search history.

(56) References Cited

U.S. PATENT DOCUMENTS

2024/0323708 A1*  9/2024  Foti ........................ H04W 76/12
2025/0119858 A1*  4/2025  Zhang ................... H04W 12/37

OTHER PUBLICATIONS

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.
"3rd Generation Partnership Project; Technical Specification Group Services and System Aspects; Procedures for the 6G System (5GS); Stage 2 (Release 17)", 3GPP TS 23.502, V17.5.0, Jun. 2022, pp. 1-744.
"3rd Generation Partnership Project; Technical Specification Group Core Network and Terminals; Non-Access-Stratum (NAS) protocol for 5G System (5GS); Stage 3; (Release 17)", 3GPP TS 24.501, V17.7.1, Jun. 2022, pp. 1-991.

(Continued)

*Primary Examiner* — Anez C Ebrahim
(74) *Attorney, Agent, or Firm* — Nokia Technologies Oy

(57)          ABSTRACT

Described are apparatuses, methods, and computer program products for enabling splitting, switching, and steering of access traffic in a system, e.g., a fifth-generation (5G) system. Access and mobility management functions (AMF) of the 5G system forward one or more of the registration requests to unified data management (UDM) functions of the PLMNs. UDM function determines whether evolved packet system (EPS) interworking (IWK) is allowed for respective registration requests based on subscription, deployment, system capabilities, a radio access technology (RAT) of an access path between the UE and the 5G system, etc. UE can include an indication that EPS IWK is requested and/or required in a registration request.

16 Claims, 12 Drawing Sheets

70 provide, to an access and mobility management function of a communication network, via a radio access network, a first registration request for registration of the user equipment with the communication network via a first access path, wherein the first registration request comprises an indication regarding whether the registration via the first access path requires evolved packet system network interworking — 71 provide, to the access and mobility management function, via the radio access network, a second registration request for registration of the user equipment with the communication network via a second access path, wherein the second registration request comprises an indication regarding whether the registration via the second access path requires evolved packet system network interworking — 72 receive, from the access and mobility management function, a first registration response indicating whether the registration of the user equipment to the communication network via the first access path requiring evolved packet system network interworking is approved — 73 receive, from the access and mobility management function, a second registration response indicating whether the registration of the user equipment to the communication network via the second access path requiring evolved packet system network interworking is approved — 74

(56) References Cited

OTHER PUBLICATIONS

"New SID on Upper layer traffic steering, switching and split over dual 3GPP access", 3GPP SA WG1 Meeting #98e, S1-221231, Agenda: 4, Qualcomm, May 9-19, 2022, 4 pages.
U.S. Appl. No. 63/222,106, "Methods and Apparatuses for Enabling a User Equipment to Register with Multiple Public Land Mobile Networks and Non-Public Networks using the Same Access Type", filed Jul. 15, 2021, pp. 1-40.

* cited by examiner

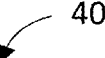

40 receive, from a unified data management function of a first communication network, information regarding a first registration between a user equipment and the first communication network and a second registration between the user equipment and the first communication network or a second communication network

41 determine, based on the information, one of the first registration or the second registration for which evolved packet system network interworking is allowed

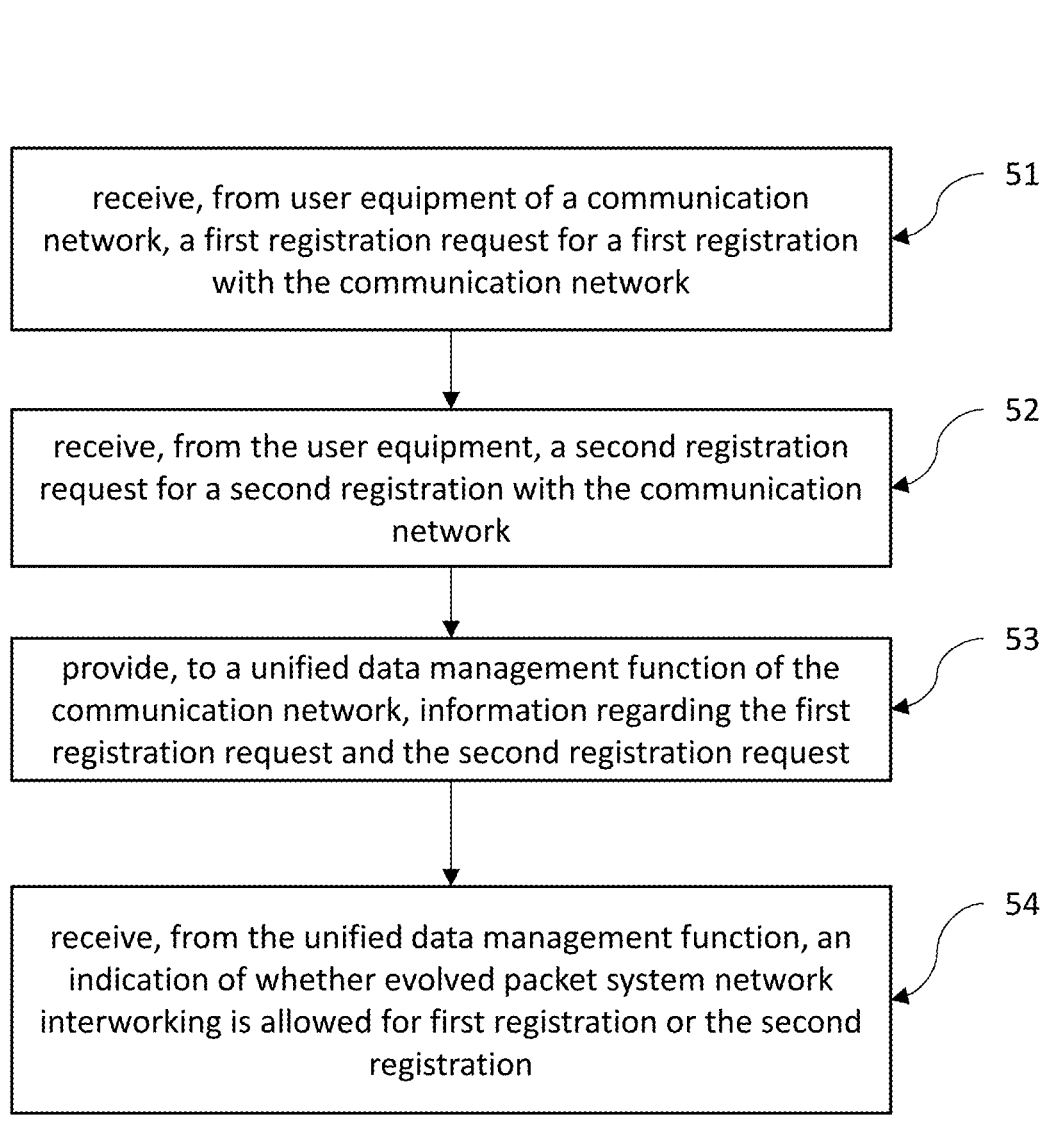

50 receive, from user equipment of a communication network, a first registration request for a first registration with the communication network — 51 receive, from the user equipment, a second registration request for a second registration with the communication network — 52 provide, to a unified data management function of the communication network, information regarding the first registration request and the second registration request — 53 receive, from the unified data management function, an indication of whether evolved packet system network interworking is allowed for first registration or the second registration — 54

FIG. 10

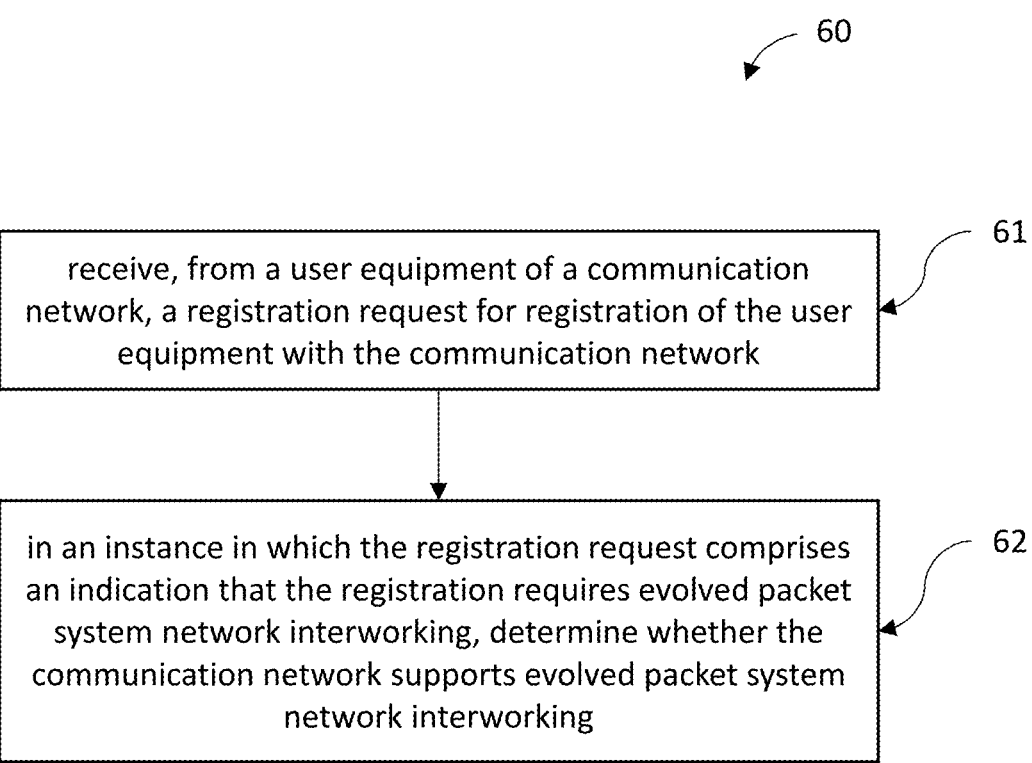

60

61 receive, from a user equipment of a communication network, a registration request for registration of the user equipment with the communication network

62 in an instance in which the registration request comprises an indication that the registration requires evolved packet system network interworking, determine whether the communication network supports evolved packet system network interworking

FIG. 11

APPARATUSES, METHODS, AND COMPUTER PROGRAM PRODUCTS FOR FIFTH-GENERATION SYSTEM MULTIPLE REGISTRATION WITH EVOLVED PACKET SYSTEM NETWORK INTER WORKING

TECHNICAL FIELD

Some example embodiments of the subject matter described herein may generally relate to mobile or wireless telecommunication systems, such as a Long Term Evolution (LTE) Universal Mobile Telecommunication System or a fifth-generation communication system (5GS)).

BACKGROUND

Examples of mobile or wireless telecommunication systems may include the Universal Mobile Telecommunications System (UMTS) comprising UMTS Terrestrial Radio Access Network (UTRAN), Long Term Evolution UMTS comprising a Long Term Evolution (LTE) Evolved UTRAN (E-UTRAN), LTE-Advanced (LTE-A), MulteFire, LTE-A Pro, and/or fifth generation (5G) or New Radio (NR) wireless communication systems. 5G wireless communication systems refer to wireless communication systems that operate using next generation (NG) radio access technology and have system architecture as defined in the $3^{rd}$ Generation Partnership Project Technical Specifications 23.501 and 23.502. A 5G wireless communication system (5GS) is mostly built on $5^{th}$ generation (5G) or new radio (NR) radio access technology, but a 5GS can also be built on the $4^{th}$ generation radio access technology. It is estimated that a 5GS built on 5G or NR radio access technology can communicate with wireless communication devices, such as mobile stations or user equipment, connected thereto at bitrates on the order of 10-20 Gbit/s or higher, and a 5GS can be configured to provide services such as enhanced mobile broadband (eMBB), ultra-reliable low-latency-communication (URLLC), and as massive machine type communication (mMTC). A 5GS can include a next generation radio access network (NG-RAN), which can provide both NR and LTE (and LTE-Advanced) radio access. It is noted that, in a NG-RAN, a radio access network (RAN) node (otherwise referred to as a base station) can provide radio access to wireless communication devices, such as a user equipment (i.e., in a similar manner as a Node B, NB, in UTRAN or the evolved NB, eNB, in E-UTRAN) and may be named next-generation NB (gNB) when built on NR and may be named next-generation eNB (NG-eNB) when built on E-UTRA.

SUMMARY

Described herein are apparatuses, methods, and computer program products for fifth-generation communication system (5GS) multiple registrations, and decision-making and signaling regarding selection of a registration for evolved packet system (EPS) network interworking. Described are apparatuses, methods, and computer program products for enabling splitting, switching, and steering of traffic in a system, e.g., a 5GS. A 5GS and/or EPS may be part of a public land mobile network (PLMN), e.g., implemented by a particular operator in a particular country. In some embodiments, an access and mobility management function (AMF) of the 5GS forwards one or more of the registration requests received from a user equipment to a unified data management (UDM) function of the PLMN. In some embodiments, the UDM function determines whether evolved packet system (EPS) interworking (IWK) is allowed for respective registration requests of the one or more registration requests based on subscription data for the user equipment, an architecture of the 5GS, capabilities of the 5GS, and a radio access technology (RAT) of an access the respective registration request is received on. In some embodiments, the UE can include an indication that EPS IWK is requested and/or an indication that EPS interworking is required in a registration request.

According to an embodiment, an apparatus can be provided that comprises means, such as at least one processor and at least one memory storing instructions, which when executed by the at least one processor cause the apparatus at least to: generate a registration request for a registration of a user equipment with a fifth-generation (5G) system; add, to the registration request, an indication regarding whether evolved packet system network interworking is requested for the registration; and provide, to an access and mobility management function of the 5G system, the registration request comprising the indication regarding whether evolved packet system network interworking is requested for the registration. In some embodiments, the at least one memory and the program codes are further configured, with the at least one processor, to cause the apparatus at least to: receive, from the access and mobility management function of the 5G system, a response to the registration request, the response comprising a further indication regarding whether evolved packet system network interworking is allowed for the registration requested in the registration request.

According to another embodiment, a method can be carried out, e.g., by means such as a processor and memory storing program codes, or an apparatus as described above. In some embodiments, the method can comprise: generating, at a user equipment, a registration request for a registration with a fifth-generation (5G) system; adding, to the registration request, an indication regarding whether evolved packet system network interworking is requested for the registration; and providing, to an access and mobility management function of the 5G system, the registration request comprising the indication regarding whether evolved packet system network interworking is requested for the registration. In some embodiments, the method can further comprise: receiving, from the access and mobility management function, a response to the registration request, the response comprising a further indication regarding whether evolved packet system network interworking is allowed for the registration requested in the registration request.

According to another embodiment, a non-transitory computer readable medium storing program codes can be provided, the program codes being operable, when executed by a processor, to cause at least: generating, at a user equipment, a registration request for a registration with a fifth-generation (5G) system; adding, to the registration request, an indication regarding whether evolved packet system network interworking is requested for the registration; and providing, to an access and mobility management function of the 5G system, the registration request comprising the indication regarding whether evolved packet system network interworking is requested for the registration. In some embodiments, the program codes, when executed by the processor, further cause at least: receiving, from the access and mobility management function, a response to the registration request, the response comprising a further indication regarding whether evolved packet system network interworking is allowed for the registration requested in the registration request.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from an access and mobility management function of a fifth-generation (5G) system, in response to a registration request for a registration with the 5G system, a registration response, the registration response including an indication regarding whether evolved packet system network interworking is allowed for said registration; and determine, based on said indication, whether evolved packet system network interworking is allowed for said registration. In some embodiments, the at least one memory and the program codes are further configured, with the at least on processor, to cause the apparatus at least to: provide, to the access and mobility management function of the 5G system, the registration request for the registration with the 5G system, wherein the registration request comprises another indication that evolved packet system network interworking is requested for the registration with the 5G system.

According to another embodiment, a method can be carried out, e.g., by means such as a processor and memory storing program codes, or an apparatus as described above. In some embodiments, the method can comprise: receiving, at a user equipment, from an access and mobility management function of a fifth-generation (5G) system, in response to a registration request for a registration with the 5G system, a registration response, the registration response including an indication regarding whether evolved packet system network interworking is allowed for said registration; and determining, based on said indication, whether evolved packet system network interworking is allowed for said registration. In some embodiments, the method can further comprise: providing, from the user equipment, to the access and mobility management function of the 5G system, the registration request for the registration with the 5G system, wherein the registration request comprises another indication that evolved packet system network interworking is requested for the registration with the 5G system.

According to another embodiment, a non-transitory computer readable medium storing program codes can be provided, the program codes being operable, when executed by a processor, to cause at least: receiving, at a user equipment, from an access and mobility management function of a fifth-generation (5G) system, in response to a registration request for a registration with the 5G system, a registration response, the registration response including an indication regarding whether evolved packet system network interworking is allowed for said registration; and determining, based on said indication, whether evolved packet system network interworking is allowed for said registration. In some embodiments, the program codes, when executed by the processor, further cause at least: providing, from the user equipment, to the access and mobility management function of the 5G system, the registration request for the registration with the 5G system, wherein the registration request comprises another indication that evolved packet system network interworking is requested for the registration with the 5G system.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: provide, to a first access and mobility management function of a first fifth-generation (5G) system, a first registration request for a first registration with the first 5G system; provide, to a second access and mobility management function of a second 5G system, a second registration request for a second registration with the second 5G system; and either receive, from the first access and mobility management function, an indication that evolved packet system network interworking is allowed for the first registration; or receive, from the second access and mobility management function, an indication that evolved packet system network interworking is allowed for the second registration.

According to another embodiment, a method can be carried out, e.g., by means such as a processor and memory storing program codes, or an apparatus as described above. In some embodiments, the method can comprise: providing, from a user equipment, to a first access and mobility management function of a first communication system, a first registration request for a first registration with the first 5G system; providing, from the user equipment, to a second access and mobility management function of a second communication system, a second registration request for a second registration with the second 5G system; and either receiving, at the user equipment, from the first access and mobility management function, an indication that evolved packet system network interworking is allowed for the first registration; or receiving, at the user equipment, from the second access and mobility management function, an indication that evolved packet system network interworking is allowed for the second registration.

According to another embodiment, a non-transitory computer readable medium storing program codes can be provided, the program codes being operable, when executed by a processor, to cause at least: providing, from a user equipment, to a first access and mobility management function of a first fifth-generation (5G) system, a first registration request for a first registration with the first 5G system; providing, from the user equipment, to a second access and mobility management function of a second 5G system, a second registration request for a second registration with the second 5G system; and either receiving, at the user equipment, from the first access and mobility management function, an indication that evolved packet system network interworking is allowed for the first registration; or receiving, at the user equipment, from the second access and mobility management function, an indication that evolved packet system network interworking is allowed for the second registration.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from a user equipment, a registration request regarding a registration between the user equipment and a fifth-generation (5G) system, the registration request comprising an indication regarding whether evolved packet system network interworking is requested for said registration; generate a message regarding the registration requested in the registration request; add, to the message, a further indication regarding whether the user equipment is requesting evolved packet system network interworking for said registration; and provide the message to a unified data management function associated with the 5G system or a home network of the user equipment.

According to another embodiment, a method can be carried out, e.g., by means such as a processor and memory storing program codes, or an apparatus as described above. In some embodiments, the method can comprise: receiving, at an access and mobility management function of a fifth-generation (5G) system, from a user equipment, a registration request regarding a registration between the user equipment and the 5G system, the registration request comprising an indication regarding whether evolved packet system network interworking is requested for said registration; generating a message regarding the registration requested in the registration request; adding, to the message, a further indication regarding whether the user equipment is requesting evolved packet system network interworking for said registration; and providing the message from the access and mobility management function to a unified data management function associated with the 5G system or a home network of the user equipment.

According to another embodiment, a non-transitory computer readable medium storing program codes can be provided, the program codes being operable, when executed by a processor, to cause at least: receiving, at an access and mobility management function of a fifth-generation (5G) system, from a user equipment, a registration request regarding a registration between the user equipment and the 5G system, the registration request comprising an indication regarding whether evolved packet system network interworking is requested for said registration; generating a message regarding the registration requested in the registration request; adding, to the message, a further indication regarding whether the user equipment is requesting evolved packet system network interworking for said registration; and providing the message from the access and mobility management function to a unified data management function associated with the 5G system or a home network of the user equipment.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from a unified data management function a unified data management function indication regarding whether evolved packet system network interworking is allowed for a registration with a fifth-generation (5G) system, the registration being associated with a user equipment; and communicate, to the user equipment, whether evolved packet system network interworking is allowed for the registration. In some embodiments, the at least one memory and the program codes are further configured, with the at least one processor, to cause the apparatus at least to: provide, to the user equipment, a registration response comprising the unified data management function indication regarding whether evolved packet system network interworking is allowed for the registration associated with the user equipment. In some embodiments, the at least one memory and the program codes are further configured, with the at least one processor, to cause the apparatus at least to: provide, to the user equipment, a User Equipment Configuration Update comprising the unified data management function indication regarding whether evolved packet system network interworking is allowed for the registration associated with the user equipment.

According to another embodiment, a method can be carried out, e.g., by means such as a processor and memory storing program codes, or an apparatus as described above. In some embodiments, the method can comprise: receiving, at an access and mobility management function, from a unified data management function, a unified data management function indication regarding whether evolved packet system network interworking is allowed for a registration with a fifth-generation (5G) system, the registration being associated with a user equipment; and communicating, to the user equipment, whether evolved packet system network interworking is allowed for said registration associated with the user equipment. In some embodiments, the method can further comprise: providing, to the user equipment, a registration response comprising an access and mobility management function indication regarding of whether evolved packet system network interworking is allowed for said registration associated with the user equipment. In some embodiments, the method can further comprise: providing, to the user equipment, a User Equipment Configuration Update comprising an access and mobility management function indication regarding whether evolved packet system network interworking is allowed for said registration associated with the user equipment.

According to another embodiment, a non-transitory computer readable medium storing program codes can be provided, the program codes being operable, when executed by a processor, to cause at least: receiving, at an access and mobility management function, from a unified data management function, a unified data management function indication regarding whether evolved packet system network interworking is allowed for a registration with a fifth-generation (5G) system, the registration being associated with a user equipment; and communicating, to the user equipment, whether evolved packet system network interworking is allowed for said registration associated with the user equipment. In some embodiments, the program codes, when executed by the processor, further cause at least: providing, to the user equipment, a registration response comprising an access and mobility management function indication regarding whether evolved packet system network interworking is allowed by the 5G system for said registration associated with the user equipment. In some embodiments, the program codes, when executed by the processor, further cause at least: providing, to the user equipment, a User Equipment Configuration Update comprising an access and mobility management function indication regarding whether evolved packet system network interworking is allowed by the 5G system for said registration associated with the user equipment.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from user equipment of a fifth-generation (5G) system, a registration request for a registration with the 5G system, the registration request comprising a user equipment indication regarding whether evolved packet system network interworking for the registration is requested; provide, to a unified data management function of the 5G system, an access and mobility management function indication regarding whether evolved packet system network interworking for the registration is requested by the user equipment; receive, from the unified data management function, a unified data management function indication regarding whether evolved packet system network interworking for a registration for an user equipment is allowed; and communicate with the user equipment regarding whether evolved packet system network interworking is allowed for the registration. In some embodiments, the indication of whether evolved packet system network interworking is allowed for the registration is determined based upon at least one of: subscription information, deployment information, 5G system capabilities, or information regarding a radio access technology of an access path between the user equipment and the 5G system.

According to another embodiment, a method can be carried out, e.g., by means such as a processor and memory storing program codes, or an apparatus as described above. In some embodiments, the method can comprise: receiving, at an access and mobility management function of a fifth-generation (5G) system, from user equipment of the 5G system, a registration request for a registration with the 5G system, the registration request comprising a user equipment indication regarding whether evolved packet system network interworking for the registration is requested; providing, to a unified data management function of the 5G system, an access and mobility management function indication regarding whether evolved packet system network interworking for the registration is requested by the user equipment; receiving, from the unified data management function, a unified data management function indication of whether evolved packet system network interworking is allowed for the registration; and communicating with the user equipment regarding whether evolved packet system network interworking is allowed for the registration. In some embodiments, the indication of whether evolved packet system network interworking is allowed for the registration is determined based upon at least one of: subscription information, deployment information, 5G system capabilities, or information regarding a radio access technology of an access path between the user equipment and the 5G system.

According to another embodiment, a non-transitory computer readable medium storing program codes can be provided, the program codes being operable, when executed by a processor, to cause at least: receiving, at an access and mobility management function of a fifth-generation (5G) system, from user equipment of the 5G system, a registration request for a registration with the 5G system, the registration request comprising a user equipment indication regarding whether evolved packet system network interworking for the registration is requested; providing, to a unified data management function of the 5G system, an access and mobility management function indication regarding whether evolved packet system network interworking for the registration is requested by the user equipment; receiving, from the unified data management function, a unified data management function indication of whether evolved packet system network interworking is allowed for the registration; and communicating with the user equipment regarding whether evolved packet system network interworking is allowed for the registration. In some embodiments, the indication of whether evolved packet system network interworking is allowed for the registration is determined based upon at least one of: subscription information, deployment information, 5G system capabilities, or information regarding a radio access technology of an access path between the user equipment and the 5G system.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from a user equipment of a fifth-generation (5G) system, a registration request for a registration of the user equipment with the 5G system, wherein the registration request comprises an indication regarding whether the registration requires evolved packet system network interworking; and determine whether the 5G system supports evolved packet system network interworking. In some embodiments, determining whether the 5G system supports evolved packet system network interworking for the registration of the user equipment with the 5G system comprises determining one or more of: subscription information, deployment information, 5G system capabilities, or information regarding a radio access technology of an access path between the user equipment and the 5G system. In some embodiments, the at least one memory and the program codes are further configured, with the at least one processor, to cause the apparatus at least to: provide a message regarding the registration request and said indication to a unified data management function of the 5G system or a home network of the user equipment; and receive, in response to the message, from the unified data management function, a further indication regarding whether evolved packet system network interworking is allowed for the registration requested in the registration request.

According to another embodiment, a method can be carried out, e.g., by means such as a processor and memory storing program codes, or an apparatus as described above. In some embodiments, the method can comprise: receiving, at an access and mobility management function of a fifth-generation (5G) system, from a user equipment of the 5G system, a registration request for a registration of the user equipment with the 5G system, wherein the registration request comprises an indication regarding whether the registration requires evolved packet system network interworking; and determining whether the 5G system supports evolved packet system network interworking. In some embodiments, determining whether the 5G system supports evolved packet system network interworking for the registration of the user equipment with the 5G system comprises determining one or more of: subscription information, deployment information, 5G system capabilities, or information regarding a radio access technology of an access path between the user equipment and the 5G system. In some embodiments, the method can further comprise: providing, from the access and mobility management function, to a unified data management function of the 5G system or a home network of the user equipment, a message regarding the registration request and said indication; and receiving, at the access and mobility management function, from the unified data management function, in response to the message, a further indication regarding whether evolved packet system network interworking is allowed for the registration requested in the registration request.

According to another embodiment, a non-transitory computer readable medium storing program codes can be provided, the program codes being operable, when executed by a processor, to cause at least: receiving, at an access and mobility management function of a fifth-generation (5G) system, from a user equipment of the 5G system, a registration request for a registration of the user equipment with the 5G system, wherein the registration request comprises an indication regarding whether the registration requires evolved packet system network interworking; and determining whether the 5G system supports evolved packet system network interworking. In some embodiments, determining whether the 5G system supports evolved packet system network interworking for the registration of the user equipment with the 5G system comprises determining one or more of: subscription information, deployment information, 5G system capabilities, or information regarding a radio access technology of an access path between the user equipment and the 5G system. In some embodiments, the program codes, when executed by the processor, further cause at least: providing, from the access and mobility management function, to a unified data management function of the 5G system or a home network of the user equipment, a message regarding the registration request and said indication; and receiving, at the access and mobility management function, from the unified data management function, in response to the message, a further indication regarding whether evolved packet system network interworking is allowed for the registration requested in the registration request.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from an access and mobility management function of a fifth-generation (5G) system, information regarding a registration request from a user equipment for a registration with the 5G system, said information comprising an access and mobility management function indication regarding whether the registration request comprises a user equipment indication regarding whether evolved packet system network interworking for the registration is requested; determine whether evolved packet system network interworking is allowed for the registration; and provide, to the access and mobility management function, a unified data management function indication regarding whether evolved packet system network interworking is allowed for the registration. In some embodiments, the determination regarding whether evolved packet system network interworking is allowed for the registration comprises determining whether evolved packet system network interworking is allowed for the registration based upon at least one of: subscription information, deployment information, 5G system capabilities, or information regarding a radio access technology of an access path between the user equipment and the 5G system.

According to another embodiment, a method can be carried out, e.g., by means such as a processor and memory storing program codes, or an apparatus as described above. In some embodiments, the method can comprise: receiving, at a unified data management function, from an access and mobility management function of a fifth-generation (5G) system, information regarding a registration request from a user equipment for a registration with the 5G system, said information comprising an access and mobility management function indication regarding whether the registration request comprises a user equipment indication regarding whether evolved packet system network interworking for the registration is requested; determining whether evolved packet system network interworking is allowed for the registration; and providing, to the access and mobility management function, a unified data management function indication regarding whether evolved packet system network interworking is allowed for the registration. In some embodiments, the determination regarding whether evolved packet system network interworking is allowed for the registration comprises determining whether evolved packet system network interworking is allowed for the registration based upon at least one of: subscription information, deployment information, 5G system capabilities, or information regarding a radio access technology of an access path between the user equipment and the 5G system.

According to another embodiment, a non-transitory computer readable medium storing program codes can be provided, the program codes being operable, when executed by a processor, to cause at least: receiving, at a unified data management function, from an access and mobility management function of a fifth-generation (5G) system, information regarding a registration request from a user equipment for a registration with the 5G system, said information comprising an access and mobility management function indication regarding whether the registration request comprises a user equipment indication regarding whether evolved packet system network interworking for the registration is requested; determining whether evolved packet system network interworking is allowed for the registration; and providing, to the access and mobility management function, a unified data management function indication regarding whether evolved packet system network interworking is allowed for the registration. In some embodiments, the determination regarding whether evolved packet system network interworking is allowed for the registration comprises determining whether evolved packet system network interworking is allowed for the registration based upon at least one of: subscription information, deployment information, 5G system capabilities, or information regarding a radio access technology of an access path between the user equipment and the 5G system.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from a unified data management function of a fifth-generation (5G) system, a message regarding a registration request associated with a user equipment, the message comprising an indication regarding whether evolved packet system network interworking is allowed for a registration, requested in the registration request, between the user equipment and the 5G system or another communication system; generate a registration response message; in an instance in which said indication is an indication that evolved packet system network interworking is not allowed for the registration, modify the registration response message to indicate to the user equipment that evolved packet system network interworking is not allowed for the registration; in an instance in which said indication is an indication that evolved packet system network interworking is allowed for the registration, modify the registration response message to indicate to the user equipment that evolved packet system network interworking is allowed for the registration; and provide, to the user equipment, the registration response message.

According to another embodiment, a method can be carried out, e.g., by means such as a processor and memory storing program codes, or an apparatus as described above. In some embodiments, the method can comprise: receiving, at an access and mobility management function of a fifth-generation (5G) system, from a unified data management function, a message regarding a registration request associated with a user equipment, the message comprising an indication regarding whether evolved packet system network interworking is allowed for a registration, requested in the registration request, between the user equipment and the 5G system or another communication system; generating a registration response message; in an instance in which said indication is an indication that evolved packet system network interworking is not allowed for the registration, modifying the registration response message to indicate to the user equipment that evolved packet system network interworking is not allowed for the registration; in an instance in which said indication is an indication that evolved packet system network interworking is allowed for the registration, modifying the registration response message to indicate to the user equipment that evolved packet system network interworking is allowed for the registration; and providing, from the access and mobility management function, to the user equipment, the registration response message.

According to another embodiment, a non-transitory computer readable medium storing program codes can be provided, the program codes being operable, when executed by a processor, to cause at least: receiving, at an access and mobility management function of a fifth-generation (5G) system, from a unified data management function, a message regarding a registration request associated with a user equipment, the message comprising an indication regarding whether evolved packet system network interworking is allowed for a registration, requested in the registration request, between the user equipment and the 5G system or another communication system; generating a registration response message; in an instance in which said indication is an indication that evolved packet system network interworking is not allowed for the registration, modifying the registration response message to indicate to the user equipment that evolved packet system network interworking is not allowed for the registration; in an instance in which said indication is an indication that evolved packet system network interworking is allowed for the registration, modifying the registration response message to indicate to the user equipment that evolved packet system network interworking is allowed for the registration; and providing, from the access and mobility management function, to the user equipment, the registration response message.

According to an embodiment, an apparatus can be provided that comprises means, such as at least one processor and at least one memory storing program codes, for carrying out a method or participating in a procedure. For example, in some embodiments, the at least one memory and the program codes are configured, with the at least one processor, to cause the apparatus at least to: receive, from one or more access and mobility management functions of one or more fifth-generation (5G) systems, information regarding a plurality of registration requests for a plurality of registrations associated with a user equipment; determine a particular registration from among the plurality of registrations for which evolved packet system network interworking is allowed; determine, based on the information regarding the plurality of registration requests received from the one or more access and mobility management functions, a particular access and mobility management function from which the particular registration was received; and provide, to the particular access and mobility management function, an indication that evolved packet system network interworking is allowed for said particular registration. In some embodiments, at least one of the plurality of registration requests comprise an indication regarding whether evolved packet system network interworking is requested for a respective registration associated with the at least one of the plurality of registration requests.

According to another embodiment, a method can be carried out, e.g., by means such as a processor and memory storing program codes, or an apparatus as described above. In some embodiments, the method can comprise: receiving, at a unified data management function, from one or more access and mobility management functions of one or more fifth-generation (5G) systems, information regarding a plurality of registration requests for a plurality of registrations associated with a user equipment; determining a particular registration from among the plurality of registrations for which evolved packet system network interworking is allowed; determining, based on the information regarding the plurality of registration requests received from the one or more access and mobility management functions, a particular access and mobility management function from which the particular registration was received; and providing, from the unified data management function, to the particular access and mobility management function, an indication that evolved packet system network interworking is allowed for said particular registration. In some embodiments, at least one of the plurality of registration requests comprise an indication regarding whether evolved packet system network interworking is requested for a respective registration associated with the at least one of the plurality of registration requests.

According to another embodiment, a non-transitory computer readable medium storing program codes can be provided, the program codes being operable, when executed by a processor, to cause at least: receiving, at a unified data management function, from one or more access and mobility management functions of one or more fifth-generation (5G) systems, information regarding a plurality of registration requests for a plurality of registrations associated with a user equipment; determining a particular registration from among the plurality of registrations for which evolved packet system network interworking is allowed; determining, based on the information regarding the plurality of registration requests received from the one or more access and mobility management functions, a particular access and mobility management function from which the particular registration was received; and providing, from the unified data management function, to the particular access and mobility management function, an indication that evolved packet system network interworking is allowed for said particular registration. In some embodiments, at least one of the plurality of registration requests comprise an indication regarding whether evolved packet system network interworking is requested for a respective registration associated with the at least one of the plurality of registration requests.

BRIEF DESCRIPTION OF THE DRAWINGS

For proper understanding of example embodiments, reference should be made to the accompanying drawings, wherein:

FIG. 9 illustrates an example flow diagram of a method, according to an embodiment;

FIG. 10 illustrates an example flow diagram of a method, according to an embodiment;

FIG. 11 illustrates an example flow diagram of a method, according to an embodiment.

DETAILED DESCRIPTION

Figure 1:
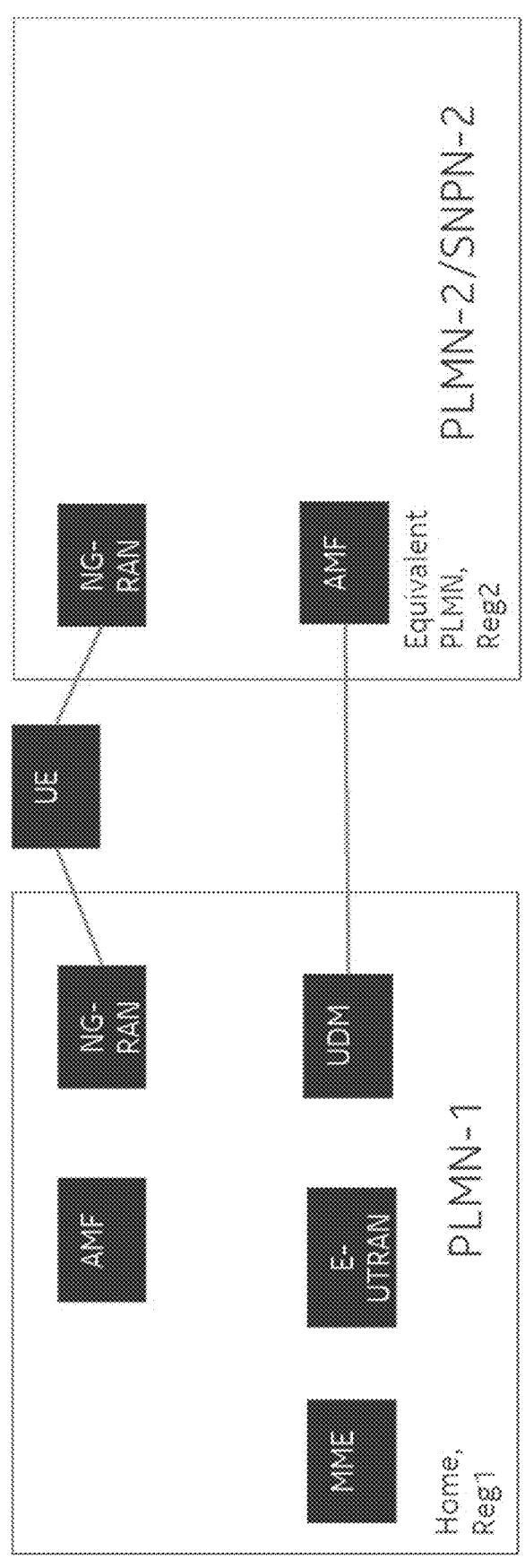
FIG. 1 illustrates a user equipment that has dual-registrations with two different mobile or wireless communication networks, according to an embodiment.

It will be readily understood that the components of certain example embodiments, as generally described and illustrated in the figures herein, may be arranged and designed in a wide variety of different configurations. Thus, in the following detailed description of some example embodiments, a user equipment (UE) may be dual registered with (i.e., have two registrations with) a core network of a mobile network (e.g. a public land mobile network) or may be dual registered with a core network of two different mobile networks (e.g. a public land mobile network (PLMN) and a non-public network (NPN) or two different PLMNs) over multiple 3GPP accesses and/or multiple non-3GPP accesses.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

In mobile networks (e.g., fifth-generation (5G) systems), a user equipment (UE) may establish multiple registrations with one or more core networks, e.g., a 5G core network. While a 5GS of a mobile network may be configured to allow dual registration of a UE to the mobile network per access type (i.e., over two accesses of the same access type), e.g., in relatively lower and higher frequencies of the same or different frequency band(s)/sub-band(s), several problems with regard to interworking (IWK) and inter-/intra-system interoperability have been identified. For example, there are questions and concerns about UE mobility, cancellation of a correct registration as needed, determination of preferred registration for interworking (IWK) with evolved packet systems (EPS) (also called EPS IWK herein), and/or the like.

For example, when a UE moves outside or towards an edge of a service area or registration area for the 5G system, the UE may be downgraded from the one or more 5G core networks to a legacy network, such as a 4G network, a 4G LTE network, or another EPS network. While the UE may maintain multiple simultaneous registrations with one or more 5G core networks in the 5G system due to the particular architecture of 5G systems, EPS networks do not allow for multiple simultaneous registrations to be maintained by a single UE. As such, when the UE is downgraded or otherwise moved from one or more 5G core networks to a single EPS network, UEs typically deregister from all 5G core networks and then carry out a new registration request procedure, a new attach request procedure, or the like, with the EPS network.

However, the global deregistration of the UE from all 5G core networks and the procedure for requesting a new registration or attachment to the EPS network represents a time-consuming, computationally costly, bandwidth extensive, and overall inefficient process for doing an inter-system change or network handover for a UE already registered with a unified data management (UDM) function of the mobile network. In order to more efficiently and quickly carry out inter-system change or network handover from the 5G core network(s) to a single EPC, one of the multiple registrations established for the UE with the 5G core network(s) can be maintained and used for single-registration communication between the UE and the EPS. However, problems arise during inter-system change or network handover of the UE from the 5G system to the EPS because some or all of various access and mobility management functions (AMFs), a mobility management entity (MME), the UDM function, the UE, and/or other elements of the 5G system do not know which of the multiple registrations is to be maintained during inter-system change or network handover.

The decision about which registration to retain can be made based on many factors, such as UE preference or request, network-side instructions, network traffic/paging density, quality of service (QoS)/quality of experience (QoE) issues, service type, emergency service status, and/or combinations of such characteristics and considerations. For example, a UE may have a first registration with a 5G core network that is used for emergency messaging, short messaging services (SMS), high-priority phone services, UE location services, and/or the like, and one or more other registrations with the same or different 5G core network(s) for other services, messaging, control signaling, data transfer, user plane communications, physical layer signaling, and/or the like. The UE may determine that it would like to maintain the first registration during inter-system change or network handover from the 5G system to an EPS due to the importance of services provisioned to the UE that are associated with the first registration or transmitted using registration information of the first registration. In such an example, the UE may want to request EPS interworking (EPS IWK) be allowed for that first registration. This can be carried out via ad hoc or dedicated signaling, can be carried out within a registration request/attach request procedure, or can be carried out by way of combined signaling/messaging between the UE and the 5G core network at some point after establishment of the first registration of the UE with the 5G core network.

An element of the 5G core network (e.g., an AMF) can receive the request from the UE that indicates that EPS IWK be allowed for the first registration, and provide that request or an information about that request to another element or function, such as the UDM. The UDM can determine based on factors, such as those discussed above and elsewhere in this disclosure, whether to allow EPS IWK for the first registration. The UDM can provide an indication of whether EPS IWK is allowed for the first registration to the UE, e.g., via the AMF or otherwise. Thereafter, if the UE is downgraded from the 5G core network to an EPS, the UE, AMF, and UDM all know whether the first registration is to be maintained and used for communication between the UE and an element or function (e.g., MME) of the EPS. This can be done in a discrete manner for each registration of the multiple registrations associated with the UE, or can be carried out in a dispositive manner for only the particular registration, of the multiple registrations associated with the UE, for which EPS IWK is allowed.

Described herein are systems, methods, apparatuses, and computer program products for UE to request EPS IWK for a particular registration, for network elements such as UDM to determine that UE are requesting EPS IWK for a particular registration, for deciding whether to allow EPS IWK for a particular registration, for deciding which particular registration from among a plurality of registrations is to be indicated as allowed for EPS IWK, for signaling an indication that EPS IWK is allowed for a particular registration and/or not allowed for a particular registration, and for receiving, at the UE, an indication that EPS IWK is allowed for the particular registration.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

A mobile network (e.g., a public land mobile PLMN or as standalone non-public network (SNPN)) that comprises a 5th generation wireless communication system (5GS) enables a UE to register simultaneously with a core network of the 5GS of a mobile network (e.g., PLMN or SNPN) over multiple accesses, where each access has an access type defined in the 3rd generation partnership project (3GPP). An AMF in the core network of the 5GS of the mobile network may include a registration management (RM) state that reflects the registration status of the UE in the mobile network. The RM state of the UE in the mobile network (e.g., PLMN or SNPN) can be a RM-DEREGISTERED state (when the UE is registered with the mobile network) or a RM-REGISTERED state when the UE is not registered with the mobile network.

A UE may be simultaneously registered (i.e., registered at the same time), using the same home network credentials, with two mobile networks (e.g., two standalone non-public networks (SNPNs), one PLMN and one SNPN, or two different PLMNs), over accesses of a same access type and may even be registered with the two networks over a same access node or access point (e.g., gNb) in a network sharing scenario. As described in TS 23.501, 5.18, a network sharing architecture can allow multiple participating network operators (i.e., operations of mobile networks) to share resources (e.g., radio resources) of a single shared radio access network according to an agreement between the network operators.

When a UE initiates registration procedure to registers the UE with a home mobile network ("home network") using a home network credential, an access and mobility management function (AMF) of a core network of a home network determines whether to accept or authorize the registration of the UE. The AMF upon accepting or authorization the registration of the UE with the home network, stores the registration of the UE with the home network credential (generally referred to as UE registration) in a unified data management (UDM) entity of the core network of the home network. However, when a UE initiates a second registration procedure to registers the UE with a second or third (or another) mobile network (e.g., another PLMN or a SNPN) over 3GPP access it is not clear which of these two UE registrations is eligible for interworking with Evolved Packet system of the second or third (or another) network. In some examples, initiation of registration with a second or third (or another) network for 3GPP access by the UE may include registering with a 5G NR over a first visited public land mobile network (VPLMN) and a second VPLMN. In EPS, multiple simultaneous registrations are not allowed. When a UE is multiply registered with PLMN(s), such as a home network including both a 5GS and an EPS, the UE will want to keep a single seat in HSS/UDM for the EPS 3GPP access, and will need to know which of the multiple registrations is eligible for EPS interworking.

As will be discussed in detail below, according to certain example embodiments of the subject matter described herein, a UE is capable of registering, using one home network credential, such as, a universal subscriber identity module (USIM), with more than one mobile or wireless communication network ("mobile network"), for example, two or more PLMNs, one PLMN and one SNPN or two or more SNPNs, simultaneously over accesses of a same access type (e.g., 3GPP access.

A UE may, using one home network credential (e.g., one USIM), register with a first mobile network (e.g., a PLMN) and, simultaneously or subsequently, register with a second mobile network (e.g., a SNPN). As one example, a UE may use IMS services provided by an IMS in the first mobile network (e.g., PLMN) and be registered with a second mobile network that is an enterprise network (e.g., SNPN) simultaneously.

A UE may to register with two mobile networks (e.g., two PLMNs, two SNPNs or one PLMN and one NPN), based on a subscriber's preference's, the UE's settings, and/or the UE's configuration. The UE may register with a first mobile network of the two mobile networks by sending a registration request comprising one or more of: a registration type, a SUCI, a 5G-GUTI, a PEI, a last visited TAI (if available), security parameters, requested NSSAI, mapping of requested NSSAI, a default configured NSSAI indication, a UE Radio Capability Update, a UE MM Core Network Capability, a PDU Session status, a List Of PDU Sessions To Be Activated, a Follow-on request, MICO mode preference (s), requested DRX parameters, LADN DNN(s), an Indicator of Requesting LADN Information, a NAS message container, a UE Policy Container comprising the list of PSIs, indication of UE support for ANDSP and an operating system identifier. The registration request may comprise other suitable information such as encryption keys and/or integrity keys, and/or the like.

Upon receipt of the registration request from the UE, a radio access network (RAN) or access network (AN) can carry out an AMF selection procedure to select an AMF and provide the registration request to the selected AMF, the selected AMF can then initiate an Identity request procedure by sending an identity request message to the UE requesting the SUCI of the UE. The UE responds to the Identity request message by provides an identity response message to the AMF that includes the SUCI of the UE. The AMF may then initiate an AUSF selection procedure, authentication/security checks, and may send a notification to a prior/old AMF (if applicable) regarding registration of the UE with the core network via said AMF. Once the selected AMF carries out a registration check with the UDM, a Get Procedure with the UDM, and PCF selection procedure to select a PCF, the AMF can provide a registration accept message to the UE.

The UE may select a second mobile network (e.g., a PLMN or NPN) to register with, using the same home credential (e.g., USIM) and an access having a same access type as the access the UE registered over with the first mobile network after having detected a first mobile network (e.g., a PLMN) supports (i.e., is capable of) multiple UE registrations per access of the same access type. More than two mobile networks (e.g., two PLMNs, a PLMN and a NPN, or two NPNs) can be considered for the same access type (e.g., up to a maximum number of simultaneous registrations over 3GPP access supported by the UE, AMF and UDM, allowed by the operator of the first network, etc.).

The UE may indicate to the mobile network (e.g., the UDM of the core network of the mobile network) that it supports multiple registrations per home credential (e.g., USIM) over accesses of the same access type by including a registration identifier in a registration request (e.g., set to 1 for the UE's first registration over an access having an access type, e.g., set to 2 for the UE's second registration with the network over an access having the same access type and so on if more were supported). In some examples, the UDM may provide for separate access paths, such as an access path or bearer route for 3GPP access and a separate access path or bearer route for non-3GPP access. However, in other examples, the UDM may provide for a single access pathway for multiple registrations between the UE and the core network.

A supporting AMF of a serving mobile network (e.g., a NPN or a PLMN) may be configured to check whether a UE context for the subscription permanent identifier (SUPI) included in the registration request sent by the UE exists for a registration identifier ("registration ID") that the UE includes in the registration request when the UE is registering with the serving network. If a UE context already exists, the AMF does not need to contact the UDM and the AMF may keep (e.g., store) the UE context associated with the SUPI per registration ID. In some examples, the AMF may register with a UDM for each UE registration the AMF serves. If the AMF has already registered the UE registration for the registration ID to the UDM, it may not be necessary for the AMF to redo the registering of the UE registration for the registration ID to the UDM. If the AMF does not have a UE context for the UE which sent a registration request that included the registration ID, the AMF may report the registration of the UE to the serving mobile network to the UDM with the registration ID provided by the UE in the registration request sent by the UE to the serving mobile network. At this time, the mobile network (e.g., PLMN or NPN) may determine whether its UDM supports (i.e., is configured to allow) multiple UE registrations per access type (i.e., multiple registrations over multiple access having the same access type).

If its UDM does not support multiple UE registrations, the AMF of the mobile network may behave as if it does not support multiple UE registrations per access type. However, if the UDM does support multiple UE registrations per access type, the UDM of the mobile network may store, for each UE registration, an address of the AMF (AMF address) in association with a registration ID of the UE registration.

If an AMF of a network (e.g., PLMN or NPN) serving the UE (generally referred to as the serving network) supports multiple registrations per access type and the UDM of the network also supports multiple registrations per access type, the AMF of the serving mobile network (e.g., PLMN or NPN) may indicate to the UE that it supports the multiple registrations per access type. The AMF of the serving mobile network may indicate to the UE that is supports multiple registrations per access type by generating a registration accept message when the AMF accepts or authorizes the registration request sent by the UE and includes, in the registration accept message, an indication that the serving mobile network supports multiple UE registrations per home credential USIM per access type and confirms that the UE is registered with the mobile network by including a globally unique temporary identifier (GUTI) and the registration ID in the registration accept message. The registration ID may be used in subsequent mobility registration updates after the initial registration. If the AMF and/or UDM does not support the multiple registrations per access type, no registration ID is included in the registration accept message sent by the AMF to the UE. In other examples, the UE shall not use a newly received registration ID if the UE already received another registration ID associated with the same registration.

If the AMF and/or the UDM does support multiple registrations per access type, the UE can use the registration ID for other suitable interactions with the network during various procedures described in the 3GPP standard, such as a deregistration procedure, a session establishment procedure, a session modification procedure, and/or the like. In some examples, the AMF may accept or authorize said registration over an access having an access type, and the UDM may delete any other UE registration over an access having the same access type. The registration ID can also be included in session management messages (e.g., in the event that the two mobile networks (e.g., two PLMNs, a PLMN and a NPN, or two NPNs) provided to the same core network in the HPLMN/H-NPN) to indicate, to the core network (e.g., SMF), the registration with which each session establishment request is associated.

The UE is configured by the HPLMN to support (i.e., be capable of) multiple registrations per access type, and the UDM may be assumed by the UE to support the multiple registrations per access type. Then, an indication that a PLMN does not support multiple registrations per access type, sent by a PLMN or NPN, means that the AMF does not support multiple registrations per access type. This can enable the UE to have a configuration in which the UE is capable of multiple registrations per access type, where one of the registrations is with a PLMN or NPN that does not support the multiple registrations per access type as the UDM can still support at most one registration per access type without a registration ID.

In some scenarios, two mobile networks (e.g., a first PLMN and a second PLMN or a PLMN and a NPN) are managed by a same network operator or by different network operators (e.g., two different network operators which have a business agreement among themselves).

Other problems and issues with the current approaches for EPS interworking, and other aspects of the present disclosure have been identified. For example, current approaches for EPS interworking allow for a maximum of a single registration over 3GPP and a single registration over non-3GPP. Further, core network elements (e.g., a AMF, UDM, and/or PCF) that can support EPS IWK with simultaneous UE registrations on multiple 3GPP and/or non-3GPP accesses. Current UEs are also not capable of EPS IWK when dual registered with the two different mobile networks.

For example, when for a UE registers with a mobile network, e.g., dual 3GPP access RATs (NR+NR, NR+LTE) including, e.g., simultaneous registration for TN (terrestrial) and/or NTN (non-terrestrial like satellite) 3GPP access, core network element support for EPS IWK has not been considered prior to this disclosure. Also, with regard to the limitations of current networks, the lack of support means that a network (e.g., PLMN or SNPN) that includes a 5GS and an EPS is not capable of providing connectivity services to a UE that is dual registered with two networks via an access type.

Further, when a UE has multiple registrations over multiple accesses of the same access type with a single network (e.g., a PLMN) or with two different but equivalent networks (e.g., two PLMNs, a PLMN and a SNPN, or a SNPN and a SNPN), current core network elements of the mobile network (or mobile networks) do not provide support for indicating which of multiple registrations is to be maintained for EPS IWK upon an intersystem change from a 5G or NR network to a legacy EPS network.

It should be noted that the UE cannot remain dual registered or multi registered with a mobile network comprising a 5GS and an EPS because the EPS does not support (i.e., is not capable of) dual registration.

Some but not all embodiments are related to dual registration of a UE to one mobile network over two accesses of the same access type or two different mobile networks over access of the same access type. However, some embodiments are related to a UE that has multiple registrations with a 5GC of a mobile network over 3GPP access or multiple registrations with 5GC of the mobile network over non-3GPP access. UEs typically have a registration with a mobile network or are registered with a mobile network over 3GPP access (or over non-3GPP access) when the UE receives a registration accept message from the mobile network; in this context, an AMF (or a network function that is responsible for connection and mobility management tasks of a mobile network) may have a registration for the UE over 3GPP when the AMF accepts the registration of the UE to the mobile network (i.e., authorizes the registration of the UE). Still other embodiments of the present disclosure are related to single registration scenarios in which the UE can have a first registration over a first access having a first access type with the mobile network, and the UE or network still needs to identify EPS IWK is allowed for the first registration in case the UE registers with the mobile network (or another mobile network) over another access of the same access type simultaneously, later, synchronously, asynchronously, and without the mobile network knowing about the new registration.

As discussed above, a UE can register with multiple mobile networks (e.g., PLMNs and NPNs) over multiple accesses having a same access type by generating a registration request for each respective registration of the UE with mobile network and sending the registration requests to an AMF of the respective mobile network over the access. The registration request sent by the UE to each respective mobile network includes a "Registration ID", and when the AMF of the respective mobile network accepts or authorizes the registration request, the AMF of the respective mobile network sends to the AMF to UE a registration accept message that includes the "Registration ID".

The present disclosure is provided to expand on the concepts related above regarding enabling the UE to register with multiple PLMNs and NPNs over multiple access having the same access type, and the use of the "Registration ID" as a non-limiting example of means for enabling the same. For example, the UE may not want to indicate the Registration ID when registering over 3GPP access, may not want to multiple registrations with the same mobile network (e.g., same AMF of a PLMN) over accesses having the same access type, may not know which of the different registrations can/should have EPS IWK, and may not know the impact of the multiple registrations over access of the same access type.

In some embodiments, access and mobility management function (AMF) of the serving 5GC of a mobile network (e.g., PLMN or SNPN) forward one or more of the registrations to the unified data management (UDM) function of the home mobile network of the user equipment. UDM determines whether evolved packet system (EPS) interworking (IWK) is allowed for respective registrations based on subscription data, deployment, capabilities of the 5GS of the mobile network, a radio access technology (RAT) of the access the UE is registered with the mobile network over, etc. In some embodiments, UE can include, in a registration request for registering the UE with the mobile network, an indication that EPS IWK is requested/required for requested registration and the AMF forwards this indication to the UDM.

For example, in a dual-registration scenario where the UE has registrations with a mobile network over two 3GPP accesses, only one of the two registrations (e.g., the registration to a 5GS over 3GPP access) can be moved towards an MME of a EPS to enable seamless interworking with legacy EPS. The present disclosure provides several non-limiting solutions to ensure that a UE is registered only once to an EPC of an EPS even if the UE is dual registered with a mobile network. For example, a UDM of a 5GC of a mobile network provides information to the AMF of the 5GC of the mobile network regarding the UE registration for which EPS IWK can be supported or not supported; accordingly the AMF can authorize EPS IWK or reject EPS IWK for a given UE registration with the mobile network. In other words, the UDM selects only one of the UE registrations for which EPS IWK is allowed. In another example, when a UE registers with a mobile network over an access, the UE indicates to the mobile network (e.g., 5GS of a mobile network) whether it would prefer the registration be subject to EPS IWK, or whether EPS IWK is required for the registration. Based on the UE's indication, the mobile network (e.g., 5GS of the mobile network) determines whether EPS IWK is/can be supported or not for the registration.

In some embodiments, a mobile network can use UE capability and information indicative of its own deployment (i.e., architecture) to determine whether the mobile network supports (i.e., is capable of subjecting a registration to EPS IWK). In some embodiments, the approaches described herein related to multiple registrations over accesses having the same access type and the signaling of EPS interworking eligibility for one or more of the multiple registrations over accesses having the same access type may be applicable for UE registrations over multiple 3GPP and/or non-3GPP accesses, in any combination, and not limited to only dual (two) registration scenarios.

Different factors, characteristics, information, elements, features, and the like may be considered by the mobile network, a network element, the UE, or otherwise in determining which of multiple registrations over multiple access of the same access type are or should be subject to EPS IWK. For example, factors/characteristics can include but are not limited to feature capabilities of a mobile network, services requested/provided/received over the access, subscription information for the UE, roaming agreements, congestion history for the mobile network, quality of experience (QoE) statistics, network overload and bottleneck predictions, N26 availability, deployment specifics, capabilities of the 5GS of the mobile network, slices supported by the mobile network, and/or UE capabilities.

Different means, such as discrete signaling, combined signaling, signaling bits, information elements (IEs), or the like, can be used by the UE, system/network, network elements, or otherwise to indicate EPS IWK preferences/capabilities/designations in an uplink or downlink direction. For example, means for indicating EPS IWK preferences/capabilities/designations in the uplink/downlink direction can include but are not limited to registration request messages, registration accept messages, attach request messages, attach accept message, GET response messages, UECM registration messages, registration modify request messages, registration modify accept messages, service request messages, and/or the like. By way of example only, in a discrete signaling scenario, the network (e.g., AMF) may provide a unique message, during a registration procedure, session establishment procedure, session modification procedure, deregistration procedure, or the like, to the UE in response to the registration request received from the UE. For example, the AMF or the like from the network-side may generate an EPS IWK message that indicates which of multiple different registrations are authorized for EPS IWK, and transmit the EPS IWK message to the UE. Alternatively, a network entity (e.g., AMF 1) of a first network may provide an EPS IWK message, such as that described above, to another network entity (e.g., AMF 2) of a second network such that that first network indicates to the second network which of multiple registrations associated with the first/second network is authorized for EPS IWK. In a combined signaling scenario, the network may include an EPS IWK message or signaling bit in another message between the network and the UE, such as a registration accept message, a system information block, or the like.

Referring now to FIG. 1, a scenario is illustrated in which a UE is dual-registered to a first mobile network (PLMN-1) and a second mobile network (PLMN-2 or SNPN-2). In the illustrated scenario, the first mobile network is the home network of the UE. The first mobile network comprises two radio access networks, a NG-RAN and a E-UTRAN, a 5GC comprising an AMF and an UDM, and an EPC (e.g., having an LTE EPC architecture) comprising a mobility management entity (MME). The second mobile network comprises an NG-RAN and an AMF. Various network functions of the 5GC and network entities of the EPC are not shown in FIG. 1 for ease of illustration. The UE is dual registered with the first mobile network over 3GPP access and registered with the second mobile network over another 3GPP access. In other words, the UE has a first registration with the first mobile network over a first 3GPP access (i.e., over NG-RAN of the first mobile network) and a second registration with the second network over a second 3GPP access (i.e., over the NG_RAN of the second mobile network). In the illustrated scenario, the first registration (associated with home network of UE) is determined (e.g., by the UDM) to be subject to EPS IWK. As illustrated, the UDM of the first mobile network (the home network of UE) can be configured to provide information to the AMF of the second mobile network (PLMN-2 or SNPN-2) indicating that EPS IWK shall be prohibited for the second registration of the UE with the second network over the second 3GPP access. In some embodiments, the AMF of the first mobile network may receive from the UDM of the first network an indication that EPS IWK is allowed (or EPS IWK is not allowed) for the first registration of the UE with the first network and the AMF may provide (e.g., transmit, send, or signal) the indication that EPS IWK is allowed (or EPS IWK is not allowed) for the first registration of the UE with the first network to the UE. In some embodiments, the UDM of the f mobile network may provide (e.g., transmit, signal, or send) an indication that the second registration of the UE with the second network.

For example, an AMF of the second mobile network, in response to receiving a registration request over 3GPP access from the UE that includes a registration ID that indicates the second registration with the second mobile network registers the UE with the second mobile network, and in response to determining from communication with the UDM of the first mobile network, that EPS IWK is not allowed for the second registration, the AMF of the second mobile network can send the UE a registration accept message that includes an indication that EPS IWK is not allowed for the second registration. Alternatively, in response to receiving a registration request over 3GPP access from the UE regarding the second registration with the second mobile network, and in response to determining from communication with the UDM of the first mobile network, that EPS IWK is allowed (or EPS IWK is required) for the second registration, the AMF of the second mobile network can send the UE a registration accept message that includes the indication that EPS IWK allowed (or EPS IWK is required for the second registration.

Additionally or alternatively, in response to receiving a registration request over 3GPP access from the UE regarding the first registration with the first mobile network, the first mobile network may determine that it is the home mobile network for the UE, determine based on one or more factors/characteristics, such as the services provided to the UE by each of multiple registrations associated with the UE and/or other factors/characteristics described elsewhere herein, that EPS IWK is not allowed for the first registration. The UDM of the first mobile network may then send a signal or message to the AMF of the second mobile network that includes an indication that EPS IWK is allowed (or EPS IWK is required) for the second registration of the UE with second network over 3GPP access. The first network can then send to the UE a registration accept message upon registering the UE with the first network that includes indication with regard to the first registration of the UE with the first network over 3GPP access.

Alternatively, in response to receiving a registration request from the UE regarding the first registration with the first mobile network, the first mobile network may determine that it is the home mobile network for the UE, determine based on one or more factors and/or characteristics such as those described herein that EPS IWK is allowed (or EPS IWK is required) for the first registration of the UE with the first mobile network. A UDM of the first mobile network may send a signal (e.g., send a message) to the AMF of the second mobile network that EPS IWK is not allowed (i.e., prohibited) for a second registration of the UE with the second mobile network. The AMF of the first mobile network may send to the UE a registration accept message upon registering the UE with the first mobile network that includes an indication that EPS IWK is allowed (or EPS IWK is required) for the first registration of the UE with the first mobile network.

Figure 2:
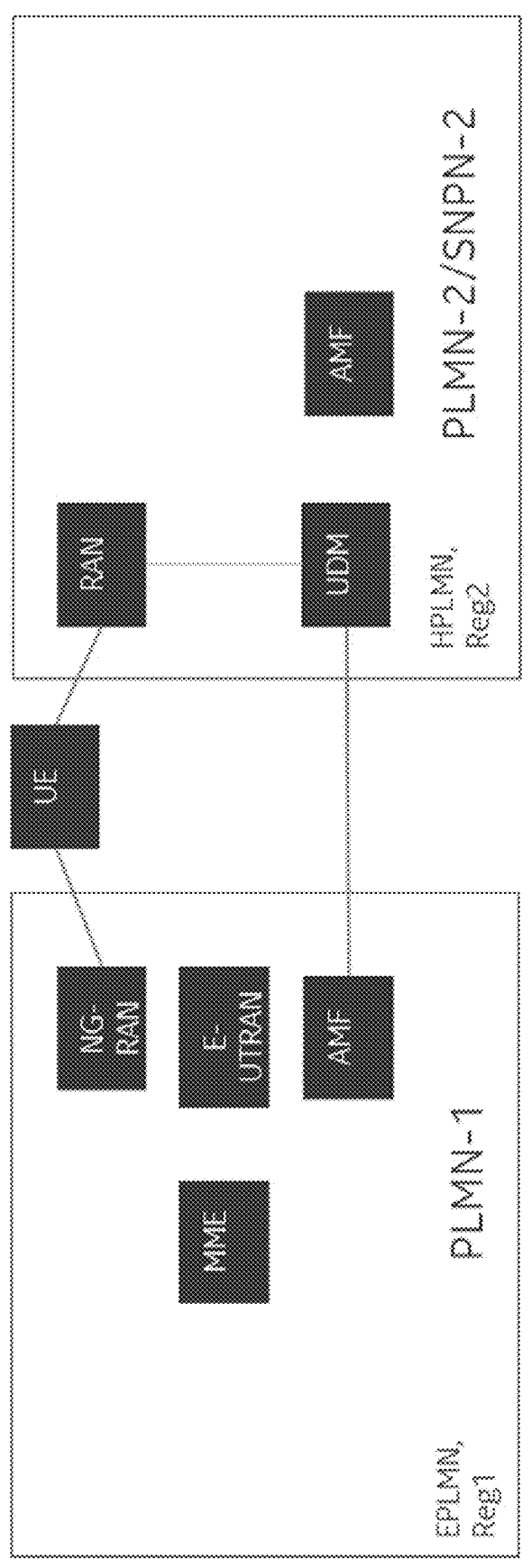
FIG. 2 illustrates a user equipment that has dual-registrations with two different mobile or wireless communication networks, according to another example embodiment.

Referring now to FIG. 2, a scenario is illustrated in which a UE is dual-registered with or in the process of dual-registering with a first mobile network (referred to as PLMN-1) and a second mobile network (referred to as PLMN-2 or SNPN-2). In the illustrated scenario of FIG. 2, the second mobile network is the home network (HPLMN) of the UE. In some embodiments, the first mobile network (PLMN-1) may be an equivalent PLMN (EPLMN) with respect to the HPLMN (second network). In some embodiments, the registration (e.g., registration identifier) with the first mobile network may therefore be allowed/authorized for EPS IWK, which may mean that EPS IWK is allowed for the UE's registration with the first mobile network UE. This may have implications with regard to the type of services (e.g., emergency services, SMS, etc.) being provided by the first network to the UE. If the first mobile network is allowed/authorized for EPS IWK, that may require that the first network includes an EPS (e.g., EPC, LTE, etc.). In this scenario, a UDM of the second network (HPLMN) provides information to the AMF of the second network indicating that EPS IWK is prohibited for the second registration of the UE with the second network. Further, the UDM of the second network can provide to the AMF of the first network an indication that EPS IWK is allowed or required for the first registration of the UE with the first network.

Furthermore, if the first registration is indicated as being allowed for EPS IWK, this means that the first registration is retained upon inter-system change or network handover between the 5G system and an EPS, which can occur for a variety of reasons.

Figure 3:
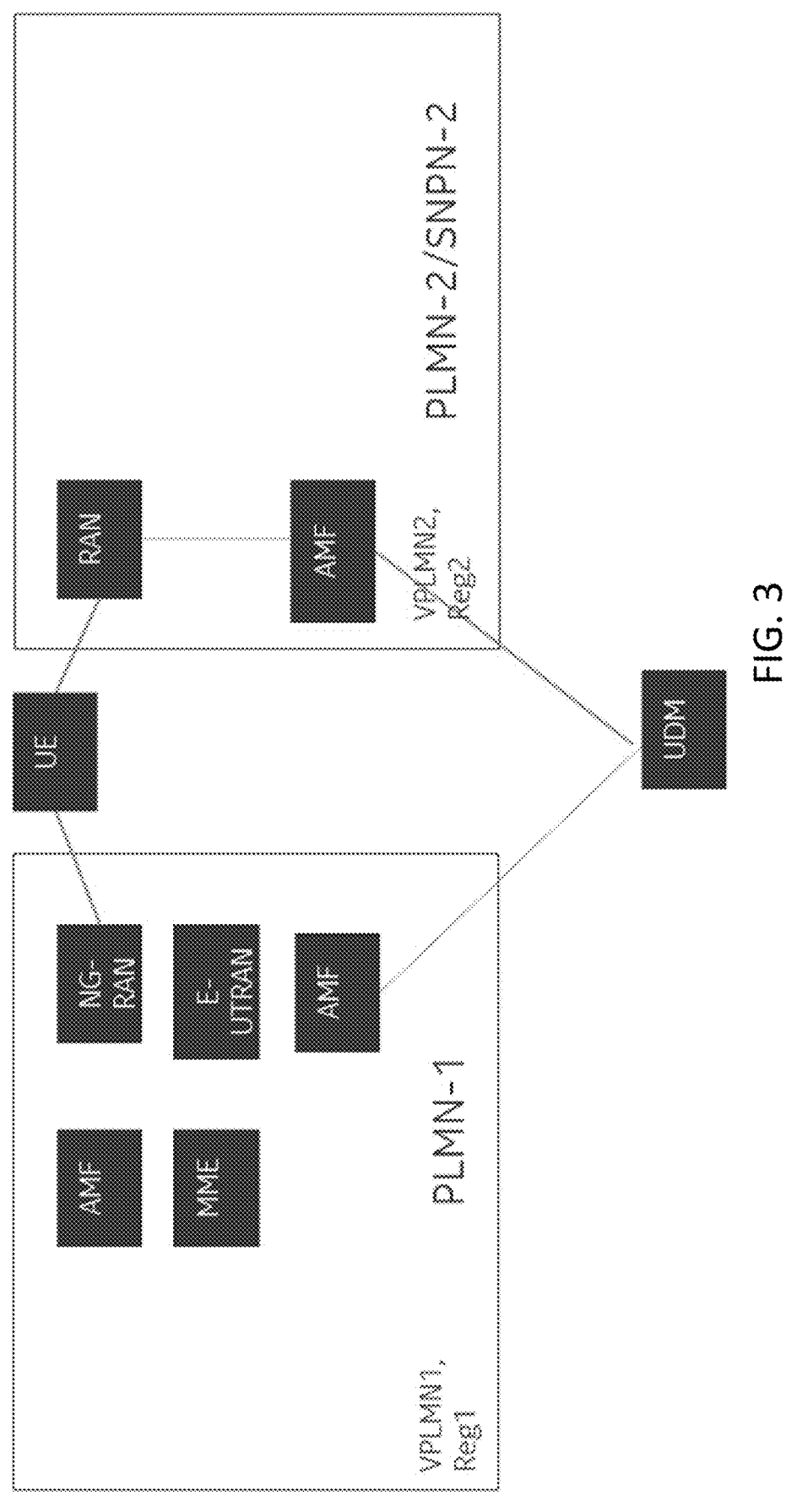
FIG. 3 illustrates a user equipment that has dual-registrations with two different mobile or wireless communication networks, according to another example embodiment.

Referring now to FIG. 3, another scenario is illustrated in which the UE is dual-registered with a first network (PLMN-1) and a second network (PLMN-2/SNPN-2), both of which are visiting PLMNs (VPLMNs. In some embodiments, the AMF of the first network and/or the AMF of the second network can communicate with the UDM of a home network (not shown) of the UE after receipt of a registration request from the UE, such as to verify the subscriber information or the like associated with a first/second registration request received from the UE. The UDM can then determine, based on any of the factors or characteristics described elsewhere herein, for which of the first registration or the second registration EPS IWK shall be allowed/required. By way of example only, the UDM may determine that EPS IWK is allowed/required only for the first registration with the first network, or alternatively that EPS IWK is allowed/required only for the second registration with the second network.

In some embodiments, a message (e.g., registration accept message) can be sent by the AMF of the first network to the UE that includes an indication whether EPS IWK is allowed or not allowed for the first registration of the UE with the first network. In some embodiments, a message (e.g., registration accept message) can be sent by the AMF of the second network to the UE that indicates whether EPS IWK is allowed or not allowed for the second registration of the UE with the second network. In some embodiments, a message can be sent by the UDM of the first network (e.g., HPLMN), or another network function of the first network (e.g., HPLMN), to the UE which includes an indication that indicates EPS IWK is allowed or EPS IWK is required for the first registration of the UE with the first network or that EPS IWK is allowed or EPS IWK is required for the second registration of the UE with the second network. After the first network (e.g., the HPLMN) determines that EPS IWK shall be allowed for the first registration of the UE with the first network ("first UE registration"), the UDM of the first network (e.g. HPLMN) can provide information to the AMF of the first network indicating that EPS IWK shall be allowed or EWK is required for the first UE registration, leading the AMF of the first network to include in a registration accept message sent to the UE in response to the first registration request sent by the UE the information indicating that EPS IWK is allowed or EPS IWK is required for the first UE registration, and can provide information to the AMF of the second network indicating that EPS IWK shall be prohibited for the second registration of the UE with the second network ("second UE registration"), leading the AMF of the second network to include in the registration accept message sent to the UE in response to the second registration request message sent by the UE, the information indicating that EPS IWK is not allowed or prohibited for the second UE registration.

Figure 4:
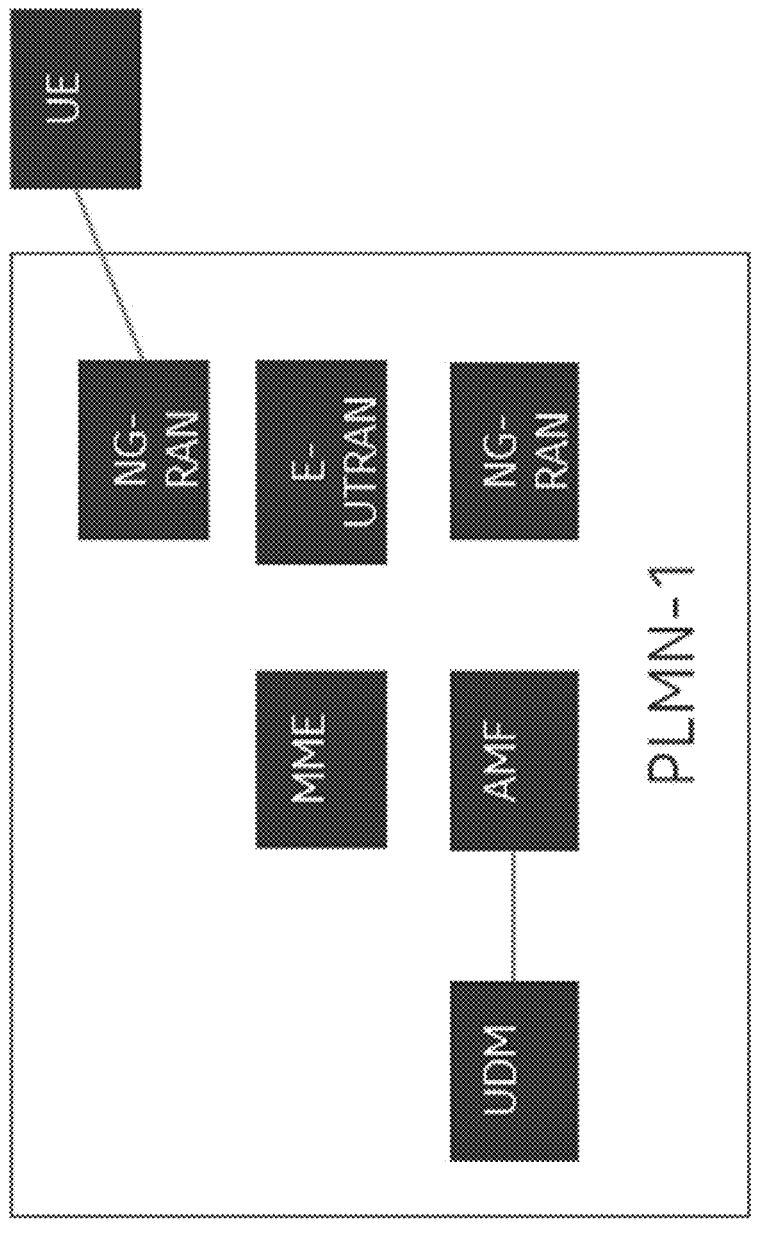
FIG. 4 illustrates a user equipment that has dual-registrations with two different mobile or wireless communication networks, according to another example embodiment.

Referring now to FIG. 4, another scenario is illustrated in which the UE is registered twice with the same network (PLMN-1) via the same AMF. In some embodiments, in such a scenario, the UDM of the network can inform the AMF of the network which of the two registrations is not allowed to IWK with EPS. As noted elsewhere, the determination by the UDM can be based on one or more factors/characteristics such as those described herein regarding whether EPS IWK is allowed for the first/second registration between the UE and the network. The means for signaling/communicating between the UDM and AMF, and between the AMF and UE, regarding allowability of EPS IWK for the first and second registrations, can include any suitable means, such as a registration message, registration accept message, authentication request message, authentication response message, other messages, indications, and signals disclosed elsewhere herein, and/or the like.

Figure 5:
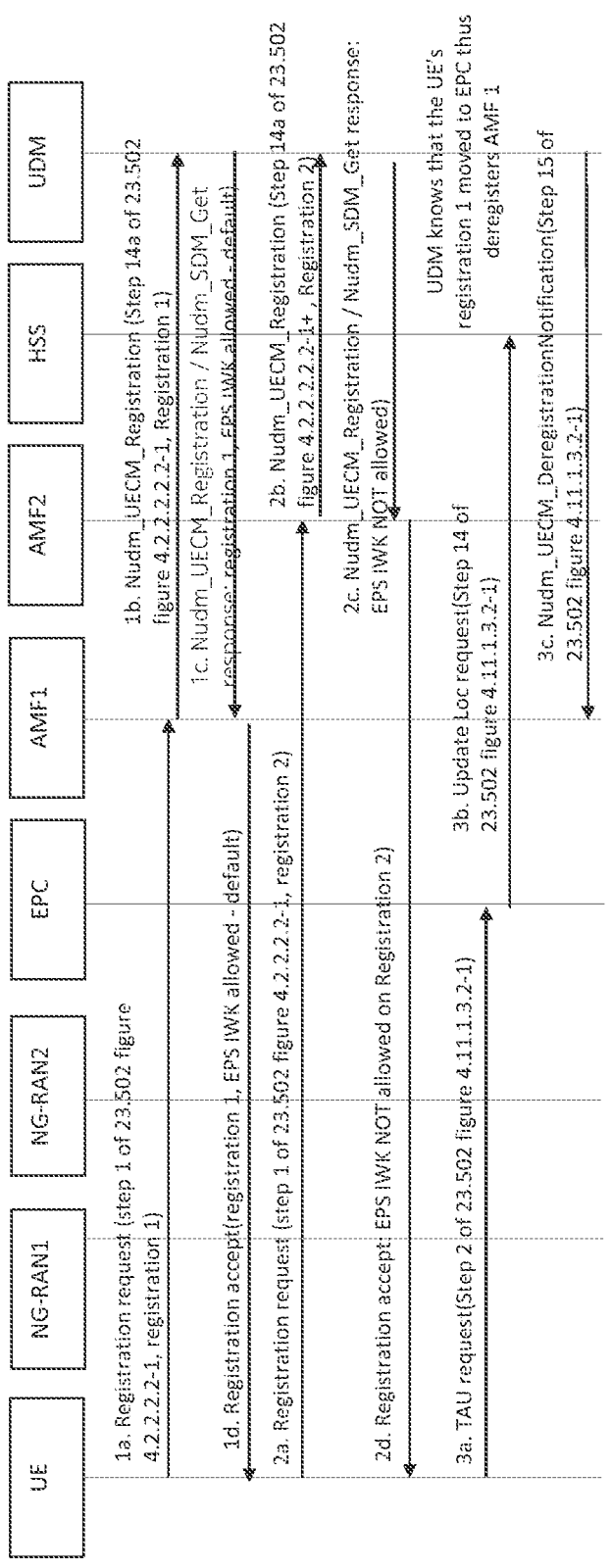
FIG. 5 illustrates an example signaling flow diagram, according to an embodiment.

Referring now to FIG. 5, according to one embodiment, example signaling is shown between a UE and various elements and features of the network regarding EPS IWK. In FIG. 5, the UE is attempting to establish dual registration over 5GS, e.g., of two different PLMNs (comprising, respectively, AMF1 and AMF2) or over the same PLMN (in which case AMF1 and AMF2 are the same element or function). The decision regarding which registration is subject to EPS IWK, is carried out by the UDM. Reference to two different PLMNs is just an example of one UE multi-registration scenario; the same or similar EPS IWK signaling approach may be used in other networks and multi-registration scenarios, e.g., for two SNPN(s), PLMN-SNPN, etc. Also, while many examples and embodiments described herein include 'dual' or 'two' registrations and/or 'dual' or 'two' networks, a person having ordinary skill in the art will readily understand that similar or the same EPS IWK decision-making and EPS IWK signaling approaches can be used in scenarios and embodiments in which more than two registrations are established with the UE and/or the UE is registered with more than two networks.

As illustrated in FIG. 5, the UE sends, at 1a, e.g., via NG-RAN1, to AMF1 of a first network, a first registration request to register the UE with the first mobile network, the first registration request including a first Registration ID. According to some embodiments, a Registration ID may comprise a unique value or identifier that may be associated with the requested registration during the request procedure, during authentication by, e.g., an AAA server or the like, and during approval of the registration. A Registration ID may also or instead be used to identify the registration after it is established and during ongoing signaling, messaging, paging, and data/control information transfer, and/or the like. In some embodiments, the UDM can carry out one or more steps from the registration procedure outlined in 3GPP TS 23.502, section 4.2.2.2.2. For example, if the AMF has changed since the last Registration procedure, or if the UE provides a SUPI which doesn't refer to a valid context in the AMF, or if the UE registers to the same AMF it has already registered to a non3GPP access (i.e. the UE is registered over a non-3GPP access and initiates this Registration procedure to add a 3GPP access), the new AMF registers with the UDM using Nudm_UECM_Registration and subscribes to be notified when the UDM deregisters this AMF. The UDM stores the AMF identity associated to the Access Type and does not remove the AMF identity associated to the other Access Type. The UDM may store information provided at registration in UDR, by Nudr_UDM_Update.

The AMF retrieves the Access and Mobility Subscription data, SMF Selection Subscription data and UE context in SMF data using Nudm_SDM_Get. This requires that UDM may retrieve this information from UDR by Nudr_UDM_Query. After a successful response is received, the AMF subscribes to be notified using Nudm_SDM_Subscribe when the data requested is modified, UDM may subscribe to UDR by Nudr_UDM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" is included in the Access and Mobility Subscription data provided to the AMF.

The new AMF provides the Access Type it serves for the UE to the UDM and the Access Type is set to "3GPP access". The UDM stores the associated Access Type together with the serving AMF in UDR by Nudr_UDM_Update. The new AMF creates an UE context for the UE after getting the Access and Mobility Subscription data from the UDM.

For an Emergency Registration in which the UE was not successfully authenticated, the AMF shall not register with the UDM. For an Emergency Registration, the AMF shall not check for access restrictions, regional restrictions or subscription restrictions. For an Emergency Registration, the AMF shall ignore any unsuccessful registration response from UDM and continue with the Registration procedure.

When the UDM stores the associated Access Type (e.g. 3GPP) together with the serving AMF, it will cause the UDM to initiate a Nudm_UECM_DeregistrationNotification to the old AMF corresponding to the same (e.g. 3GPP) access, if one exists. The old AMF removes the UE context of the UE. If the serving NF removal reason indicated by the UDM is Initial Registration, then the old AMF invokes the Nsmf_PDUSession_ReleaseSMContext (SUPI, PDU Session ID) service operation towards all the associated SMF(s) of the UE to notify that the UE is deregistered from old AMF. The SMF(s) shall release the PDU Session on getting this notification.

At 1b, AMF1 of the first mobile network sends messages, denoted Nudm_UECM_Registration and Nudm_SDM_Get including the first Registration ID to the UDM. Once the UDM receives the Nudm_UECM_Registration and Nudm_SDM_Get messages from AMF1, it can carry out a validity check on these messages, can carry out an authentication check, can validate subscriber information, can verify that the network has capacity for the additional network load expected after establishment of the registration for the UE, can determine or generate a network key or the like for the registration, and can otherwise evaluate whether the registration can be established for the UE.

At 1c, the UDM responds to the AMF1 with a Nudm_UECM_Registration/Nudm_SDM_Get response that includes the first Registration ID and an indication regarding whether EPS IWK is allowed for the first registration of the UE with the first mobile network. At 1d, the AMF1 responds to first registration request message by sending to the UE, a first registration accept message that includes the first Registration ID and the indication regarding whether EPS IWK is allowed for the first registration received from the UDM.

In some embodiments, at 1a to 1d, the UE indicates a first value for the first Registration ID in the first Registration Request message to the AMF1 (that goes through NG-RAN1), and the AMF1 provides the first Registration ID to the UDM. UDM decides (e.g., based on subscription data for the UE, deployment, and/or UE capabilities) to allow EPS IWK for the first registration having the first Registration ID, hence UDM includes an indication that EPS IWK is allowed in the Response message to AMF1, and AMF1 provides this value to the UE in the first Registration Accept message. Additionally or alternatively, the parameter "EPS IWK is allowed" may not be indicated where absence of this parameter indicates the default value which is "EPS IWK is allowed".

At step 2a, the UE provides, e.g., via NG-RAN2, to AMF2, a second registration request including a second Registration ID. At step 2b, AMF2 sends a second Nudm_UECM_Registration and Nudm_SDM_Get set of messages including the second Registration ID to the UDM. At step 2c, the UDM responds to the AMF2 with a Nudm_UECM_Registration/Nudm_SDM_Get response including the second Registration ID and an indication regarding whether EPS IWK is allowed for the second registration. At step 2d, the AMF2 responds to the UE with a second Registration accept message including the second Registration ID and the indication regarding whether EPS IWK is allowed for the second registration.

In some embodiments, in steps 2a to 2d, the second registration request goes to AMF2 and can include a second value. In some embodiments, the UDM decides NOT to allow EPS IWK for the second registration (e.g., based on subscription, deployment, capabilities, . . . etc., and also based on that EPS IWK was allowed for the first Registration ID), hence UDM indicates "EPS IWK NOT allowed" in the response, and that parameter is propagated to the UE in the Registration Accept message. In some embodiments, the UDM may be configured to ensure that a maximum of one registration over 3GPP access is eligible for EPS interworking.

Based on the preceding steps, the UE and the network functions now know which registration is subject to EPS IWK and which is not subject to EPS IWK.

In steps 3a to 3c, assuming a mobility to EPS has happened for the first Registration ID, meaning that the UE must carry out or is subject to an inter-system change or network handover between the 5G system and the EPS, the UE will know to pursue or participate in that handover from the 5G system to the EPS using the first Registration ID since the UDM indicated the EPS IWK is allowed for the registration associated with the first Registration ID. As such, when such a mobility happens or is determined to be imminently happening between the 5GS and the EPS, the UE can trigger a TAU procedure using the first Registration ID since EPS IWK is allowed for the first Registration ID. It is to be noted that Registration ID might not be included in normal TAU procedures. In other instances, the Registration ID might be included in normal TAU procedures. In some embodiments, the UDM may know that for the first Registration ID, EPS IWK is possible, and may choose to deregister AMF1 instead of AMF2 due to the UE mobility to EPS.

Before, during, or after the mobility to EPS has happened for the first Registration ID, the UE, AMF1, EPC, MME of EPS, HSS, or other element of the mobile network can provide an indication to the UDM that the mobility has occurred. For example, when an element or function (e.g., MME) of the EPC receives the TAU request from the UE indicating the intended mobility of the first Registration ID to the EPS, it can send an Update Loc request to the HSS and indicate to the UDM that the mobility is occurring for the first Registration ID, or the HSS can receive the Update Loc request and separately indicate to the UDM that the mobility is occurring for the first Registration ID. Regardless, the UDM will identify the multiple Registration IDs associated with the UE, note that the first Registration ID has already been allowed for EPS IWK, and know to initiate a dereg-istration procedure for all other Registration IDs besides the first Registration ID. For example, the UDM can send a Nudm_UECM_DeregistrationNotification message to AMF1 indicating that the second Registration ID and/or other Registration IDs are no longer in use and no longer valid for communication between the UE and 5GS. The UDM can also or instead send a deregistration message to AMF2 and/or other AMFs to indicate that the other Regis-tration IDs besides the first Registration ID are not subject to the mobility from 5G core to EPC. Additionally or alternatively, the UDM can provide authentication, verifi-cation, or confirmation to the EPC, directly or via an AMF, that the first Registration ID is associated with a registration for which EPC IWK is allowed. Thereafter, the EPS can carry out a connection reestablishment procedure or the like to continue service provisioning to the UE via the EPC, continue uplink and downlink communication of data and control information between the UE and EPC, and carry out other necessary functions, data transfers, paging, messaging, or other signaling, using the first Registration ID where needed.

In some embodiments, a security context can be estab-lished between the UE and 5GS for the first registration and associated with the first Registration ID, and that same security context can be used or maintained for secure communication with the EPC after mobility of the first Registration ID to the EPS.

Figure 6:
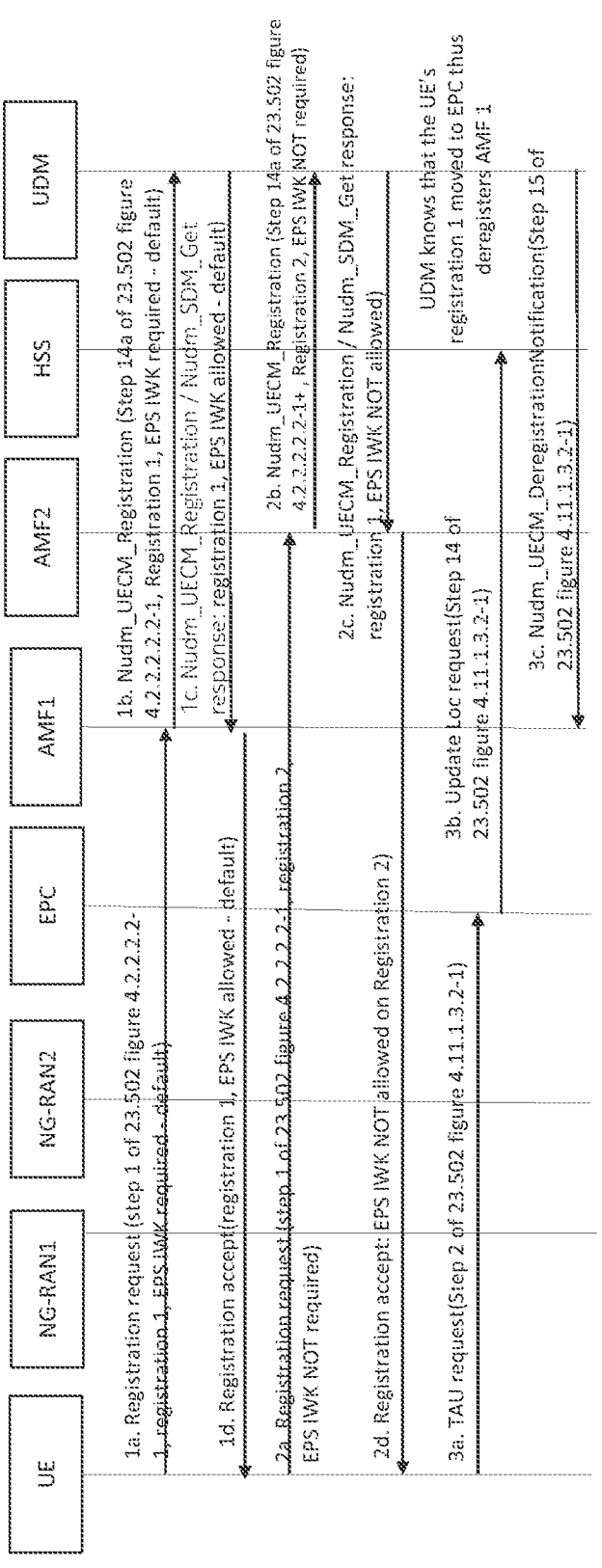
FIG. 6 illustrates an example signaling flow diagram, according to an embodiment.

Referring now to FIG. 6, according to one embodiment, example signaling is shown between a UE and various elements and features of the network regarding EPS IWK. In FIG. 6, the UE is attempting to establish dual registration over 5GS, e.g., over two different PLMNs (comprising, respectively, AMF1 and AMF2) or over the same PLMN (in which case AMF1 and AMF2 are the same element or function). According to the embodiment of FIG. 6, the decision regarding which registration is subject to EPS IWK, is requested out by the UDM. Here, reference to two different PLMNs is just an example as the same or similar mechanisms could also apply, e.g., for two SNPN(s), for a PLMN and a SNPN, etc.

As illustrated in FIG. 6, the UE can provide, at step 1a, e.g., via NG-RAN1, to AMF1, a first registration request including a first Registration ID and an indication regarding whether EPS IWK is requested or required for the first registration. At step 1b, AMF1 sends a first Nudm_UECM-_Registration and Nudm_SDM_Get set of messages includ-ing the first Registration ID and the indication regarding whether EPS IWK is requested or required to the UDM. At step 1c, the UDM responds to the AMF1 with a first Nudm_UECM_Registration/Nudm_SDM_Get response including the first Registration ID and an indication regard-ing whether EPS IWK is allowed for the first registration. At step 1d, the AMF1 responds to the UE with a first Regis-tration accept message including the first Registration ID and the indication regarding whether EPS IWK is allowed for the first registration.

In some embodiments, in steps 1a to 1d, the UE indicates in the Registration Request message to the AMF1 (that goes through NG-RAN1) that "EPS IWK is required" for that first registration, which can be considered as a request/preference from the UE. Subsequently, AMF1 provides this Registra-tion ID to the UDM together with the parameter "EPS IWK is required" indication. Additionally or alternatively, the parameter "EPS IWK is required" may not be indicated by the UE where absence of this parameter indicates the default value which is "EPS IWK is required". Additionally or alternatively, a parameter "EPS IWK is not required" may be indicated by the UE for that first registration. Subsequently, the UDM acknowledges back to AMF1 (based on subscrip-tion, deployment, capabilities, . . . etc.) whether to allow EPS IWK for that first registration, and AMF1 provides this value to the UE (e.g., "EPS IWK is allowed") in a first Registration Accept message.

In step 2a, the UE can provide, at step 2a, e.g., via NG-RAN2, to AMF2, a second registration request includ-ing a second Registration ID and an indication regarding whether EPS IWK is requested or required for the second registration. At step 2b, AMF2 sends a second Nudm-_UECM_Registration and Nudm_SDM_Get set of message including the second Registration ID and the indication regarding whether EPS IWK is requested or required to the UDM. At step 2c, the UDM responds to the AMF2 with a second Nudm_UECM_Registration/Nudm_SDM_Get response including the second Registration ID and an indi-cation regarding whether EPS IWK is allowed for the second registration. At step 2d, the AMF2 responds to the UE with a second Registration accept message including the second Registration ID and the indication regarding whether EPS IWK is allowed for the second registration.

In some embodiments, in steps 2a to 2d, the UE indicates in the second Registration Request message to the AMF2 (that goes through NG-RAN2) that "EPS IWK is required" for that second registration, which can be considered as a request/preference from the UE. Subsequently, AMF2 pro-vides this second Registration ID to the UDM together with the parameter "EPS IWK is required" indication. Addition-ally or alternatively, the parameter "EPS IWK is required" may not be indicated by the UE where absence of this parameter indicates the default value which is "EPS IWK is required". Additionally or alternatively, a parameter "EPS IWK is not required" may be indicated by the UE for that second registration. Subsequently, the UDM acknowledges back to AMF2 (based on subscription, deployment, capa-bilities, . . . etc.) whether to allow EPS IWK for that second registration, and AMF2 provides this value to the UE (e.g., "EPS IWK NOT allowed") in a second Registration Accept message.

Now, both UE and Network functions know which of the first or second registration is subject to EPS IWK and which is not.

In some embodiments, in steps 3a to 3c, assuming a mobility to EPS has happened for the Registration ID 1, the UE may trigger a normal TAU procedure since the EPS IWK is allowed for the first Registration ID. In some embodi-ments, the first Registration ID may not be included in the TAU procedure. According to some embodiments, the UDM knows that for the first Registration ID/first registration with the first network, EPS IWK is allowed, and the UDM correctly Deregisters AMF1 due to the UE mobility to EPS.

According to some embodiments, it may be important to ensure that only a single EPS Registration is maintained. As such, in some embodiments, in a Connected mode HO, the NG-RAN is configured to not trigger HO for the registration for which EPS IWK is NOT allowed, based on an indication received from the 5GC. In some embodiments, in an Idle mode HO, the network (5GS) may transfer to EPS the UE the context only for the "EPS IWK allowed" registration, e.g., the 5GS registration for which EPS IWK is allowed by the 5GS. In some embodiments, the MME may reject a TAU request if triggered from the UE (e.g., applying currently used NAS signaling and reject cause codes). In some embodiments, the AMF can transfer the context to the MME only for a registration for which "EPS IWK is allowed". The UE when trying to trigger IDLE mode mobility from 5GS to EPS should provide an EPS GUTI (temporary identifier sent to MME) that is mapped from the 5G-GUTI corresponding to the 5GS registration for which it has received the indication that EPS interworking is allowed for that registration.

In some embodiments, the AMF may be configured to provide a registration ID to the UDM only if the UE provides a registration ID and the AMF supports it. In some embodiments, as long as the UE has multiple registrations with the same AMF on a given PLMN/SNPN, the AMF assigns the same GUTI for the UE for all the registrations. In some embodiments, the AMF and the UE may maintain context for each registration separately, and associate each respective context with the correct registration IDs. In some embodiments, in order to support NTN, for a UE initially registered in a non-geographical AMF, it may be necessary to switch NTN N2 related termination from a non-geographical NTN AMF towards an AMF that supports terrestrial network access when the UE registers to TN access.

Figure 7:
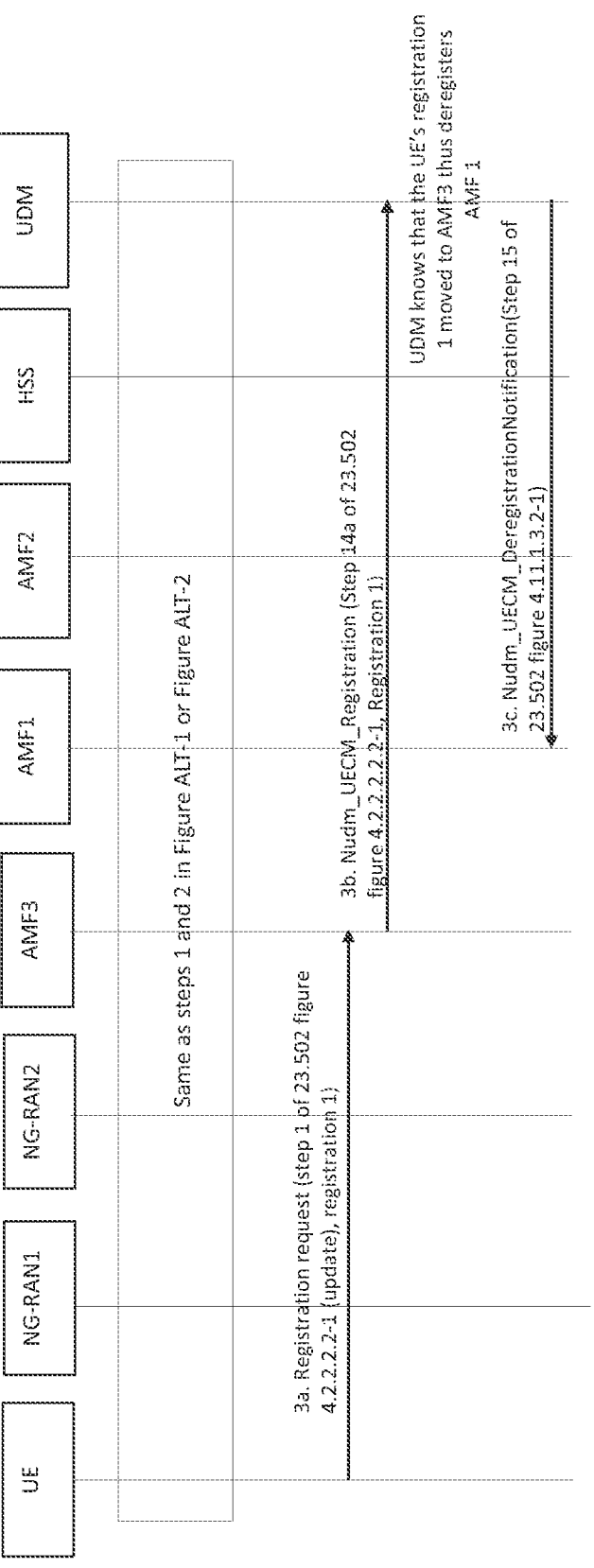
FIG. 7 illustrates an example signaling flow diagram, according to an embodiment.

Referring now to FIG. 7, another aspect of intra-network mobility to consider is UE mobility within a 5GS and the implications of EPS IWK on a Cancel Location procedure when UE moves to a new AMF within the same 5GC. As illustrated in FIG. 7, the UE is assumed to be dual-registered with a first AMF (AMF1) of the 5GC and a second AMF (AMF2) of the same 5GC, and one of the first or second registration, with the first or second AMF, must be deregistered upon registration of the UE with a new AMF (AMF3) of the same 5GC.

Here, similar to the signaling shown in FIGS. 5 and 6, the UE establishes dual registration with the 5GC. For example, the same or similar steps (1 and 2) to steps 1a-2d above with regard to FIG. 5 or 6, for dual registration of the UE with the 5GS via two different access paths (e.g., via NG-RAN1 and AMF1, or via NG-RAN2 and AMF2).

In some embodiments, in steps 3a to 3c, the Registration ID previously used in the registration procedure via AMF1 for the first registration has moved to another 5G cell that is controlled by another AMF (AMF3). Here, the UE may indicate the first Registration ID in the Mobility Registration Request procedure that goes to AMF3. AMF3 can provide the first Registration ID to the UDM with a third Nudm_UECM_Registration request. The UDM knows that the first Registration ID has moved from AMF1 to AMF3. As such, the UDM will deregister or perform a Cancel Location procedure with the correct AMF, which is AMF1, during or following the successful Mobility Registration Request procedure. This may be carried out by sending a Nudm_UECM_DeregistrationNotification message to AMF1.

In some embodiments, as part of the Mobility Registration Request procedure, the UDM can refer to previously cached information or an indication associated with the first Registration ID to determine whether EPS IWK was previously determined to be requested/required/allowed for the first Registration ID or the first registration associated with the first Registration ID.

If, for example, the UDM receives the first Registration ID with the Mobility Registration Request procedure, and then determines that EPS IWK is not requested/required/allowed for the first Registration ID or the first registration associated with the first Registration ID, then the UDM may carry out the Cancel Location procedure, e.g., by sending a Nudm_UECM_DeregistrationNotification message to AMF1.

However, if, for example, the UDM receives the first Registration ID with a request to initiate a Mobility Registration Request procedure, and then determines that EPS IWK is requested/required/allowed for the first Registration ID or the first registration associated with the first Registration ID, then the UDM may refrain from carrying out the Cancel Location procedure, e.g., by sending a Nudm_UECM_DeregistrationNotification message to AMF1. In such an instance, the UDM may reject the Mobility Registration Request and indicate to the AMF3 that the incorrect Registration ID was provided.

The processes described herein provide for simple and practical solutions to support dual registration of a UE with a mobile or wireless communication networks, such as a PLMN or SNPN comprising a 5GS and an EPS, without requiring that the EPS to be replaced with a 5GS comprising a NG-RAN and a 5GC. In some embodiments, the network (e.g., the PLMN or SNPN) allows multiple UE registrations therewith, but only allows EPS IWK for only one of the multiple UE registrations.

Figures 8A, 8B, 8C:
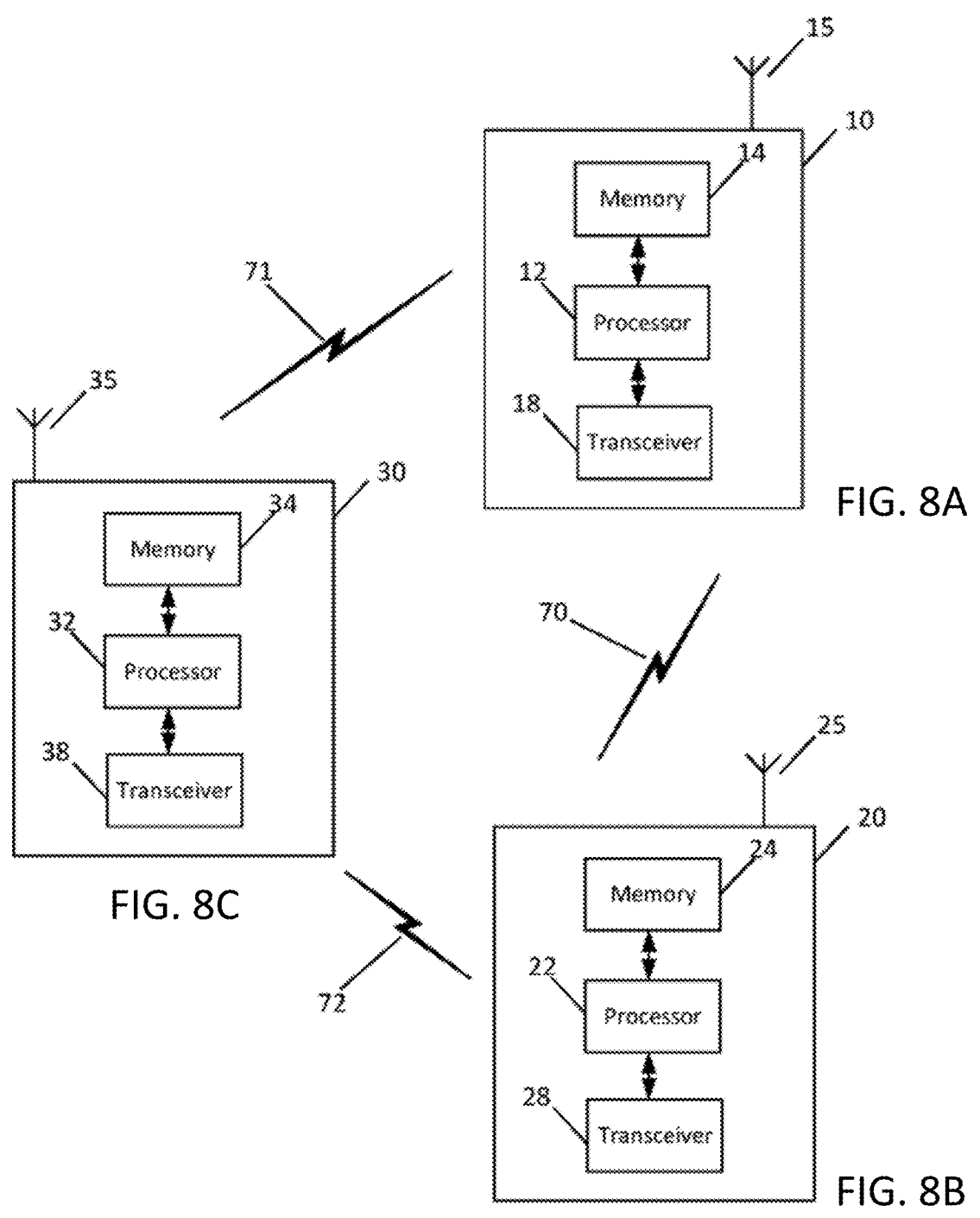
FIG. 8A illustrates an example block diagram of an apparatus, according to an example embodiment.
FIG. 8B illustrates an example block diagram of an apparatus, according to an example embodiment.
FIG. 8C illustrates an example block diagram of an apparatus, according to an example embodiment.

FIG. 8A illustrates an example of an apparatus 10 according to an embodiment. In an embodiment, apparatus 10 may be an access node of a mobile or wireless communication network. For example, apparatus 10 may be a satellite, a Node B, an evolved Node B (eNB), 5G Node B, a next generation Node B (NG-NB or gNB), a WLAN access point, a TRP, an IAB node, or HAPS. In example embodiments, apparatus 10 may be a gNB of NG-RAN, an eNB of an E-UTRAN.

It should be understood that, in some example embodiments, apparatus 10 may be a part of or comprise a distributed computing system, e.g., a server and a radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8A.

As illustrated in the example of FIG. 8A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster). Processor 12 may perform functions associated with the operation of apparatus 10, which may include, for example, precoding of antenna gain parameters and phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories, and may be any suitable volatile or non-volatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software and/or firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As discussed elsewhere in more detail, in certain embodiments, apparatus 10 may be a NW node or RAN node, such as a base station, access point, Node B, eNB, gNB, WLAN access point, or the like. In one embodiment, apparatus 10 may be an access node or AMF of a network, or the like. For example, in some embodiments, apparatus 10 may be configured to perform one or more of the processes depicted in any of the flow charts or signaling diagrams described herein, such as those illustrated in FIGS. 5-7, in any suitable scenario, such as those illustrated in FIGS. 1-4. In some embodiments, as discussed herein, apparatus 10 may be configured to perform a procedure relating to enabling or facilitating a UE to register with multiple PLMNs and/or NPNs using the same access type, as described elsewhere herein, for instance.

FIG. 8B illustrates an example of an apparatus 20 according to another embodiment. In an embodiment, apparatus 20 may be a user equipment. A user equipment may be a mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HIMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like. It should be noted that one of ordinary skill in the art would understand that apparatus 20 may include components or features not shown in FIG. 8B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8B.

As illustrated in the example of FIG. 8B, apparatus 20 may include or be coupled to a processor 22 for processing information and executing instructions or operations. Processor 22 may be any type of general or specific purpose processor. In fact, processor 22 may include one or more general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain parameters and phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry, processing means, control circuitry, or control means. In addition, in some embodiments, transceiver 28 may be included in or may form a part of transceiving circuitry or transceiving means.

As discussed elsewhere in more detail, according to some embodiments, apparatus 20 may be a UE, communication node, mobile equipment (ME), mobile station, mobile device, stationary device, IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as that illustrated in FIGS. 5-7. Thus, according to an embodiment, apparatus 20 may be configured to perform a procedure relating to enabling a UE to register with multiple PLMNs and/or NPNs using the same access type, as discussed elsewhere herein, for instance.

FIG. 8C illustrates an example of an apparatus 30 according to another example embodiment. In an example embodiment, apparatus 30 may be a node or element in a communications network or associated with such a communications network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a UDM, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8C.

As illustrated in the example of FIG. 8C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain parameters and/or phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed elsewhere in more detail, according to some example embodiments, apparatus 30 may be or may be included in a UDM, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 5-7. According to certain example embodiments, apparatus 30 may be configured to perform a procedure relating to enabling a UE to register with multiple PLMNs and/or NPNs using the same access type, as described elsewhere herein, for instance.

In some embodiments, an apparatus (e.g., apparatus 10 and/or apparatus 20 and/or apparatus 30) may include means for performing a method, a process, or any of the variants discussed herein. Examples of the means may include one or more processors, memory, controllers, transmitters, receivers, and/or computer program code for causing the performance of the operations.

For example, as illustrated in FIG. 9, an apparatus (e.g., apparatus 10 and/or apparatus 20 and/or apparatus 30) may include means for performing a method 40. According to some embodiments, apparatus can be configured to carry out the method 40 by being configured to receive, from a unified data management function of a first communication network, information regarding a first registration between a user equipment and the first communication network and a second registration between the user equipment and the first communication network or a second communication network, at 41. In some embodiments, the information comprises a first indication of whether the apparatus can authorize evolved packet system network interworking of the first registration for the user equipment and a second indication of whether the apparatus can authorize evolved packet system network interworking of the second registration for the user equipment. In some embodiments, the apparatus can be further configured to carry out the method 40 by being configured to determine, based on the information, one of the first registration or the second registration for which evolved packet system network interworking is allowed.

In some embodiments, the information further comprises one or more of: subscription information, deployment information, communication network capabilities, or information regarding a radio access technology of an access path between the user equipment and the first or second communication network. For a variety of reasons, the UE may need to move from being multiply registered with one or more 5GS to being singularly registered with an EPS. The UE may determine or know for which of the first registration or the second registration EPS IWK is allowed by the UDM. Before, during, or after mobility of the first registration or the second registration from the 5GS to the EPS, the UE may provide a TAU request to the EPC to initiate the handover of the particular registration for which EPS IWK is allowed.

Referring now to FIG. 10, an apparatus (e.g., apparatus 10 and/or apparatus 20 and/or apparatus 30) may include means for performing another method 50. According to some embodiments, the apparatus can be configured to carry out the method 50 by being configured to receive, from user equipment of a communication network, a first registration request for a first registration with the communication network, at 51. According to some embodiments, the apparatus can be further configured to carry out the method 50 by being configured to receive, from the user equipment, a second registration request for a second registration with the communication network, at 52. According to some embodiments, the apparatus can be configured to carry out the method 50 by being configured to provide, to a unified data management function of the communication network, information regarding the first registration request and the second registration request, at 53. According to some embodiments, the apparatus can be configured to carry out the method 50 by being configured to receive, from the unified data management function, an indication of whether evolved packet system network interworking is allowed for the first registration or the second registration, at 54.

In some embodiments, the indication of whether evolved packet system network interworking is allowed for the user equipment via the first access path or the second access path is determined based upon at least one of: subscription information, deployment information, communication network capabilities, or information regarding a radio access technology of the first or second access path between the user equipment and the communication network. While the method 50 is described as including two registration requests, in other embodiments, a method can include receiving requests for three or more registrations, providing the three or more registration requests to the UDM, and receiving an indication regarding for which registration EPS IWK is allowed by the UDM. The indication regarding EPS IWK being allowed for a particular registration can be provided to the UE and/or another network element, can be stored for later use if registration mobility between the 5GS and an EPS is required, and/or can be used later during a TAU request by the UE to retain the registration for which EPS IWK is allowed during mobility from the 5GS and the EPS.

Referring now to FIG. 11, an apparatus (e.g., apparatus 10 and/or apparatus 20 and/or apparatus 30) may include means for performing another method 60. According to some embodiments, the apparatus can be configured to carry out the method 60 by being configured to receive, from a user equipment of a communication network, a registration request for registration of the user equipment with the communication network, at 61. According to some embodiments, the apparatus can be further configured to carry out the method 60 by being configured to receive, from a user equipment of a communication network, a registration request for registration of the user equipment with the communication network, at 62. According to some embodiments, the registration request can comprise an indication regarding whether the registration requires evolved packet system network interworking. According to some embodiments, the apparatus can be configured to carry out the method 60 by being configured to in an instance in which the registration request comprises an indication that the registration requires evolved packet system network interworking, determine whether the communication network supports evolved packet system network interworking, at 63.

In some embodiments, determining whether the communication network supports evolved packet system network interworking for the registration of the user equipment with the communication network comprises determining one or more of: subscription information, deployment information, communication network capabilities, or information regarding a radio access technology of an access path between the user equipment and the communication network.

Figure 12:
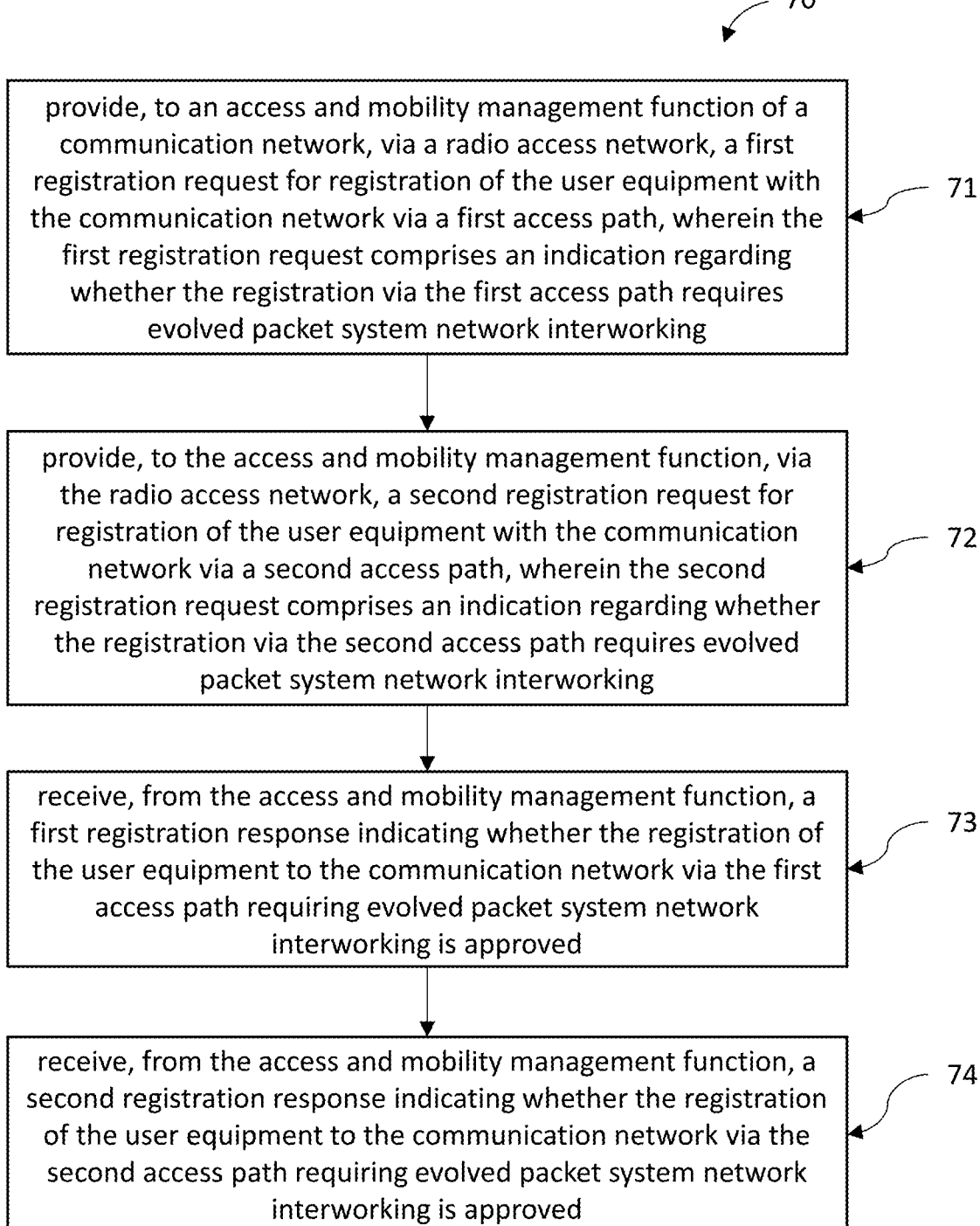
FIG. 12 illustrates an example flow diagram of a method, according to an embodiment.

Referring now to FIG. 12, an apparatus (e.g., apparatus 10 and/or apparatus 20 and/or apparatus 30) may include means for performing another method 70. According to some embodiments, the apparatus can be configured to carry out the method 70 by being configured to provide, to an access and mobility management function of a communication network, via a radio access network, a first registration request for registration of the user equipment with the communication network via a first access path, wherein the first registration request comprises an indication regarding whether the registration via the first access path requires evolved packet system network interworking, at 71. According to some embodiments, the apparatus can be further configured to carry out the method 70 by being configured to provide, to the access and mobility management function, via the radio access network, a second registration request for registration of the user equipment with the communication network via a second access path, wherein the second registration request comprises an indication regarding whether the registration via the second access path requires evolved packet system network interworking, at 72. According to some embodiments, the apparatus can be configured to carry out the method 70 by being configured receive, from the access and mobility management function, a first registration response indicating whether the registration of the user equipment to the communication network via the first access path requiring evolved packet system network interworking is approved, at 73. According to some embodiments, the apparatus can be configured to carry out the method 70 by being configured to receive, from the access and mobility management function, a second registration response indicating whether the registration of the user equipment to the communication network via the second access path requiring evolved packet system network interworking is approved, at 74.

In view of the foregoing, certain example embodiments provide several technological improvements, enhancements, and/or advantages over existing technological processes and constitute an improvement at least to the technological field of wireless network control and/or management. For example, as discussed in detail elsewhere in this disclosure, certain embodiments provide ways to enable a UE to register with multiple PLMNs and/or NPNs using the same access type. As a result of some example embodiments, it is now possible to register, with one credential or USIM, with more than one network using the same 3GPP access type. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments discussed in this disclosure may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. A user equipment (UE) comprising:

at least one processor; and at least one memory storing instructions that, when executed by the at least one processor, cause the UE at least to perform operations, the operations comprising:

generating a registration request for a registration of the UE with a 5$^{th}$ generation (5G) core network;

sending, to an access and mobility management function (AMF) of the 5G core network, the registration request that is generated;

receiving, from the AMF of the 5G core network, a response to the registration request, the response indicating that the registration of UE with the 5G core network is accepted, the response comprising an evolved packet system interworking (EPS IWK) indication indicating whether interworking with an evolved packet system (EPS) is allowed for the registration of the UE; and based on determining that the UE has another registration with another 5G core network, the UE received another EPS IWK indication indicating that interworking with the EPS is not allowed for the another registration of the UE, the UE is subject to handover from the 5G core network to the EPS, and that the EPS IWK indication indicates that interworking with the EPS is allowed for the registration of the UE, sending, to the EPS, a tracking area update (TAU) request to initiate the handover of the registration of the UE to EPS.

2. The UE of claim 1, wherein the operations further comprise:

sending to the AMF of the 5G core network, one or more other registration requests for one or more other registrations of the UE with the 5G core network; and receiving, from the AMF of the 5G core network, one or more other responses to the one or more other registration requests, wherein a respective other response of the one or more other responses for a respective other registration of the one or more other registrations indicates acceptance of the respective other registration of the UE.

3. The apparatus of claim 2, wherein the respective other response comprises an EPS IWK indication indicating that interworking with the EPS is not allowed for the respective other registration of the UE.

4. The UE of claim 1, wherein the 5G core network and the another 5G core network are in a mobile network.

5. The UE of claim 1, wherein the 5G core network is in a mobile network and the another 5G core network is in another mobile network of the UE.

6. The UE of claim 5, wherein the another mobile network is a home network of the UE.

7. The UE of claim 1, wherein the operations further comprise:

receiving, from the 5G core network, a security context for the registration of the UE; and after the sending, to the EPS, the tracking area update request to initiate the handover of the second registration of the UE to EPS, communicating with the EPS using the security context for the registration of the UE.

8. The UE of claim 1, wherein the response to the registration request for the registration comprises a registration identifier associated with the registration, and wherein the TAU request includes the registration identifier.

9. A user equipment (UE) comprising:

at least one processor; and at least one memory storing instructions that, when executed by the at least one processor, cause the UE at least to:

generate a first registration request for a first registration of the UE with a first $5^{th}$ generation (5G) core network;

insert, into the first registration request, an indication that the UE requests evolved packet system interworking (EPS IWK) be allowed for the first registration of the UE;

send, to an access and mobility management function (AMF) of the first 5G core network, the first registration request;

generate a second registration request for a second registration of the UE with the 5G core network;

send, to the AMF of the 5G core network, the second registration request;

receive, from the AMF of the 5G core network, a first response to the first registration request, the first response comprising an indication indicating that EPS IWK is allowed for the first registration of the UE;

receive, from the AMF of the 5G core network, a second response to the second registration request, the second response comprising an indication that EPS IWK is not allowed for second registration of the UE; and in an instance in which the UE is required to move to an EPS, sending, to the EPS, a tracking area update (TAU) request to initiate handover of the first registration of the UE to the EPS.

10. The UE of claim 9, wherein the first 5G core network and the second 5G core network are included in a first mobile network.

11. The UE of claim 9, wherein the first 5G network is included in a first mobile network and the second 5G core network is included in a second mobile network.

12. The UE of claim 9, wherein the first mobile network is a home network of the UE.

13. The UE of claim 9, wherein the response to the first registration request for the first registration comprises a first registration identifier associated with the first registration, and wherein the TAU request includes the first registration identifier.

14. An apparatus comprising:

one or more processors; and one or more memory storing instructions of a united data management (UDM) function of a $5^{th}$ generation (5G) core network, wherein the instructions, when executed by the one or more processors, cause the apparatus at least to perform operations, the operations comprising:

receiving, from an access and mobility management function (AMF) of the 5G core network, information regarding a registration request for registration of a user equipment (UE) with the 5G core network;

determining whether evolved packet system network interworking (EPS IWK) is allowed for the registration of the UE with the 5G core network based on at least one of: subscription information of the UE, information about capabilities of the 5G core network, or information regarding a radio access technology of an access path between the user equipment and the 5G core network; and providing, to the access and mobility management function, an indication indicating whether EPS IWK is allowed for the registration.

15. The apparatus of claim 14, wherein said information regarding the registration request comprises information indicating whether the registration request comprises a request from the UE for EPS IWK for the registration of the UE with the 5G system, and wherein the determining is in response to the information indicating the registration request comprising a request from the UE for EPS IWK for the registration of the UE with the 5G core network.

16. The apparatus of claim 14, wherein the operations further comprise:

receiving, from the AMF, information regarding one or more other registrations of the user equipment; and for each respective other registration of the one or more other registrations:

determining whether EPS IWK is allowed for the respective other registration of the UE; and in an instance in which EPS IWK is determined to be allowed for the registration of the UE and determined to not be allowed for the respective other registration of the UE, providing, to the AMF, an indication that EPS IWK is not allowed for the respective other registration of the UE.

* * * * *